US008120461B2

(12) United States Patent
Zimmerman et al.

(10) Patent No.: US 8,120,461 B2
(45) Date of Patent: Feb. 21, 2012

(54) AUTOMATIC DATA COLLECTION DEVICE, METHOD AND ARTICLE

(75) Inventors: Timothy M. Zimmerman, Union, NC (US); Kelly J. Ungs, Linn, IA (US)

(73) Assignee: Intermec IP Corp., Everett, WA (US)

( * ) Notice: Subject to any disclaimer, the term of this patent is extended or adjusted under 35 U.S.C. 154(b) by 1169 days.

(21) Appl. No.: 11/397,923

(22) Filed: Apr. 3, 2006

(65) Prior Publication Data

US 2007/0229261 A1 Oct. 4, 2007

(51) Int. Cl.
*H04Q 5/22* (2006.01)
*G08B 13/14* (2006.01)

(52) U.S. Cl. ............. 340/10.1; 340/10.2; 340/10.3; 340/10.4; 340/10.5; 340/572.7

(58) Field of Classification Search ........ 340/10.1–10.5, 340/572.7, 572.4, 522; 343/700, 795
See application file for complete search history.

(56) References Cited

U.S. PATENT DOCUMENTS

| 836,531 A | 11/1906 | Pickard | |
|---|---|---|---|
| 837,616 A | 12/1906 | Dunwoody | |
| 3,710,337 A | 1/1973 | Grant | 343/701 |
| 3,852,755 A | 12/1974 | Works et al. | 343/701 |
| 3,949,403 A | 4/1976 | Yoshida et al. | 343/225 |
| 4,056,710 A | 11/1977 | Shepardson et al. | 235/437 |
| 4,079,482 A | 3/1978 | Yeh | 197/1 A |
| 4,080,603 A | 3/1978 | Moody | 343/712 |
| 4,307,293 A | 12/1981 | Lazzarotti et al. | 235/462 |
| 4,344,184 A | 8/1982 | Edwards | 455/95 |
| 4,354,101 A | 10/1982 | Hester et al. | 235/463 |
| 4,385,231 A | 5/1983 | Mizutani et al. | 235/382 |
| 4,443,794 A | 4/1984 | Sakurai | 340/748 |
| 4,523,087 A | 6/1985 | Benton | 235/379 |
| 4,562,102 A | 12/1985 | Rabuse et al. | 428/43 |
| 4,567,361 A | 1/1986 | Rosenthal | 235/462 |
| 4,575,621 A | 3/1986 | Dreifus | 235/380 |
| 4,589,144 A | 5/1986 | Namba | 382/61 |
| 4,728,784 A | 3/1988 | Stewart | 235/462 |
| 4,742,567 A | 5/1988 | Ohe et al. | 455/277 |
| 4,782,221 A | 11/1988 | Brass et al. | 235/494 |

(Continued)

FOREIGN PATENT DOCUMENTS

DE 33 30 261 A1 3/1985

(Continued)

OTHER PUBLICATIONS

Straw, R., et al., *The ARRL Handbook—For Radio Amateurs*, 76$^{th}$ ed., The American Radio Relay League, Newington, CT, 1999, chapter 20, "Antennas & Projects," pp. 20.31-20.37.

(Continued)

*Primary Examiner* — Nam V Nguyen
(74) *Attorney, Agent, or Firm* — Seed IP Law Group PLLC

(57) ABSTRACT

A radio frequency identification system comprises a radio-frequency identification substrate and an interrogator. In one embodiment, the radio-frequency identification substrate comprises a plurality of radio-frequency identification devices. In one embodiment, a first radio-frequency identification device on the substrate monitors an indication of a response of a second radio-frequency identification device on the substrate to an interrogation signal and selectively responds to the interrogation signal based on the monitoring of the indication.

28 Claims, 9 Drawing Sheets

U.S. PATENT DOCUMENTS

| | | | |
|---|---|---|---|
| 4,785,451 A | 11/1988 | Sako et al. | 371/37 |
| 4,786,792 A | 11/1988 | Pierce et al. | 235/456 |
| 4,792,910 A | 12/1988 | Lange | 364/519 |
| 4,794,239 A | 12/1988 | Allais | 235/462 |
| 4,810,867 A | 3/1989 | Speicher | 235/494 |
| 4,816,839 A | 3/1989 | Landt | 343/795 |
| 4,823,311 A | 4/1989 | Hunter et al. | 364/900 |
| 4,827,395 A | 5/1989 | Anders et al. | 364/138 |
| 4,841,128 A | 6/1989 | Gröttrup et al. | 235/491 |
| 4,853,705 A | 8/1989 | Landt | 343/803 |
| 4,855,581 A | 8/1989 | Mertel et al. | 235/462 |
| 4,915,519 A | 4/1990 | Afzali-Ardakani et al. | 400/120 |
| 4,916,296 A | 4/1990 | Streck | 235/454 |
| 4,980,544 A | 12/1990 | Winter | 235/436 |
| 5,047,860 A | 9/1991 | Rogalski | 358/198 |
| 5,075,691 A | 12/1991 | Garay et al. | 343/830 |
| 5,095,382 A | 3/1992 | Abe | 359/489 |
| 5,097,263 A | 3/1992 | Delpech et al. | 341/155 |
| 5,097,484 A | 3/1992 | Akaiwa | 375/40 |
| 5,101,200 A | 3/1992 | Swett | 340/937 |
| 5,128,526 A | 7/1992 | Yoshida | 235/456 |
| 5,142,292 A | 8/1992 | Chang | 343/742 |
| 5,160,023 A | 11/1992 | Adams et al. | 206/256 |
| 5,184,005 A | 2/1993 | Ukai et al. | 235/472 |
| 5,204,515 A | 4/1993 | Yoshida | 235/456 |
| 5,216,233 A | 6/1993 | Main et al. | 235/472 |
| 5,216,419 A | 6/1993 | Fujisaka et al. | 340/825.54 |
| 5,218,689 A | 6/1993 | Hotle | 395/425 |
| 5,220,335 A | 6/1993 | Huang | 343/700 |
| 5,243,655 A | 9/1993 | Wang | 380/51 |
| 5,267,800 A | 12/1993 | Petteruti et al. | 400/88 |
| 5,278,395 A | 1/1994 | Benezet | 235/384 |
| 5,280,159 A | 1/1994 | Schultz et al. | 231/382 |
| 5,298,731 A | 3/1994 | Ett | 235/494 |
| 5,300,761 A | 4/1994 | Kasahara et al. | 235/375 |
| 5,315,511 A | 5/1994 | Matsuura et al. | 364/408 |
| 5,324,922 A | 6/1994 | Roberts | 235/375 |
| 5,324,927 A | 6/1994 | Williams | 235/494 |
| 5,341,381 A | 8/1994 | Fuller | 371/10.1 |
| 5,381,998 A | 1/1995 | Griffin | 251/117 |
| 5,382,778 A | 1/1995 | Takahira et al. | 235/380 |
| 5,382,784 A | 1/1995 | Eberhardt | 235/472 |
| 5,387,783 A | 2/1995 | Mihm et al. | 235/375 |
| 5,389,770 A | 2/1995 | Ackley | 235/462 |
| 5,420,403 A | 5/1995 | Allum et al. | 235/375 |
| 5,430,441 A | 7/1995 | Bickley et al. | 340/825.54 |
| 5,434,401 A | 7/1995 | Bauser | 235/454 |
| 5,434,572 A | 7/1995 | Smith | 342/44 |
| 5,448,110 A | 9/1995 | Tuttle et al. | 257/723 |
| 5,463,643 A | 10/1995 | Gaskins et al. | 371/40.1 |
| 5,466,501 A | 11/1995 | Logan et al. | 428/40 |
| 5,479,515 A | 12/1995 | Longacre, Jr. | 380/54 |
| 5,484,997 A | 1/1996 | Haynes | 235/492 |
| 5,489,908 A | 2/1996 | Orthmann et al. | 342/42 |
| 5,497,701 A | 3/1996 | Uland | 101/288 |
| 5,499,397 A | 3/1996 | Wadin et al. | 455/277.1 |
| 5,514,858 A | 5/1996 | Ackley | 235/462 |
| 5,521,601 A | 5/1996 | Kandlur et al. | 342/44 |
| 5,521,815 A | 5/1996 | Rose, Jr. | 364/409 |
| 5,528,222 A | 6/1996 | Moskowitz et al. | 340/572 |
| 5,536,924 A | 7/1996 | Ackley | 235/454 |
| 5,539,191 A | 7/1996 | Ackley | 235/462 |
| 5,548,110 A | 8/1996 | Storch et al. | 235/472 |
| 5,550,365 A | 8/1996 | Klancnik et al. | 235/462 |
| 5,550,547 A | 8/1996 | Chan et al. | 342/42 |
| 5,552,591 A | 9/1996 | Bossen et al. | 235/462 |
| 5,553,041 A | 9/1996 | Inagawa et al. | 369/48 |
| 5,553,084 A | 9/1996 | Ackley et al. | 371/37.1 |
| 5,554,974 A | 9/1996 | Brady et al. | 340/572 |
| 5,557,092 A | 9/1996 | Ackley et al. | 235/462 |
| 5,560,293 A | 10/1996 | Boreali et al. | 101/288 |
| 5,563,402 A | 10/1996 | Reddersen et al. | 235/436 |
| 5,565,847 A | 10/1996 | Gambino et al. | 340/572 |
| 5,566,441 A | 10/1996 | Marsh et al. | 29/600 |
| 5,588,005 A | 12/1996 | Ali et al. | 370/346 |
| 5,594,228 A | 1/1997 | Swartz et al. | 235/383 |
| 5,612,531 A | 3/1997 | Barkan | 235/462 |
| 5,619,027 A | 4/1997 | Ackley | 235/462 |
| 5,629,508 A | 5/1997 | Findley, Jr. et al. | 235/38 R |
| 5,640,002 A | 6/1997 | Ruppert et al. | 235/472 |
| 5,659,431 A | 8/1997 | Ackley | 359/798 |
| 5,673,037 A | 9/1997 | Cesar et al. | 340/825.54 |
| 5,712,643 A | 1/1998 | Skladany | 343/700 MS |
| 5,723,853 A | 3/1998 | Longacre, Jr. et al. | 235/472 |
| 5,729,201 A | 3/1998 | Jahnes et al. | 340/572 |
| 5,761,219 A | 6/1998 | Maltsev | 371/37.01 |
| 5,761,529 A | 6/1998 | Raji et al. | 395/824 |
| 5,763,867 A | 6/1998 | Main et al. | 235/472 |
| 5,767,498 A | 6/1998 | Heske, III et al. | 235/463 |
| 5,777,310 A | 7/1998 | Liu et al. | 235/462 |
| 5,777,561 A | 7/1998 | Chieu et al. | 340/825.54 |
| 5,782,496 A | 7/1998 | Casper et al. | 283/81 |
| 5,786,626 A | 7/1998 | Brady et al. | 257/673 |
| 5,788,796 A | 8/1998 | Look et al. | 156/277 |
| 5,805,082 A | 9/1998 | Hassett | 340/928 |
| 5,811,781 A | 9/1998 | Ackley | 235/462 |
| 5,812,065 A | 9/1998 | Schrott et al. | 340/825.54 |
| 5,818,031 A | 10/1998 | Endoh | 235/494 |
| 5,840,657 A | 11/1998 | Mehta et al. | 503/204 |
| 5,842,118 A | 11/1998 | Wood, Jr. | 455/101 |
| 5,874,896 A | 2/1999 | Lowe et al. | 340/572 |
| 5,874,902 A * | 2/1999 | Heinrich et al. | 340/10.51 |
| 5,923,305 A | 7/1999 | Sadler et al. | 343/895 |
| 5,942,987 A | 8/1999 | Heinrich et al. | 340/825.54 |
| 5,956,649 A | 9/1999 | Mitra et al. | 455/522 |
| 5,972,156 A | 10/1999 | Brady et al. | 156/280 |
| 5,973,598 A | 10/1999 | Beigel | 340/572.1 |
| 5,973,600 A | 10/1999 | Mosher, Jr. | 340/572.8 |
| 5,979,773 A | 11/1999 | Findley, Jr. et al. | 235/492 |
| 5,982,904 A | 11/1999 | Eghtesadi et al. | 381/74 |
| 5,993,093 A | 11/1999 | Schoennauer et al. | 400/621 |
| 6,003,775 A | 12/1999 | Ackley | 235/472.01 |
| 6,012,638 A | 1/2000 | Ackley et al. | 235/462.01 |
| 6,019,865 A | 2/2000 | Palmer et al. | 156/265 |
| 6,024,289 A | 2/2000 | Ackley | 235/494 |
| 6,025,784 A | 2/2000 | Mish | 340/693.5 |
| 6,076,064 A | 6/2000 | Rose, Jr. | 705/1 |
| 6,078,259 A | 6/2000 | Brady et al. | 340/572.7 |
| 6,081,718 A | 6/2000 | Ando et al. | 455/447 |
| 6,092,133 A | 7/2000 | Erola et al. | 710/102 |
| 6,097,301 A | 8/2000 | Tuttle | 340/693.9 |
| 6,104,311 A * | 8/2000 | Lastinger | 340/10.51 |
| 6,118,379 A | 9/2000 | Kodukula et al. | 340/572.8 |
| 6,123,796 A | 9/2000 | Kathmann et al. | 156/249 |
| 6,149,059 A | 11/2000 | Ackley | 235/462 |
| 6,180,198 B1 | 1/2001 | Bond | 428/43 |
| 6,192,222 B1 | 2/2001 | Greeff et al. | 455/106 |
| 6,210,515 B1 | 4/2001 | Boreali et al. | 156/250 |
| 6,243,013 B1 | 6/2001 | Duan et al. | |
| 6,246,326 B1 | 6/2001 | Wiklof et al. | 340/572.1 |
| 6,259,372 B1 | 7/2001 | Taranowski et al. | 340/683 |
| 6,272,242 B1 | 8/2001 | Saitoh et al. | 382/187 |
| 6,278,413 B1 | 8/2001 | Hugh et al. | 343/818 |
| 6,285,342 B1 | 9/2001 | Brady et al. | 343/895 |
| 6,286,763 B1 | 9/2001 | Reynolds et al. | 235/472.01 |
| 6,321,986 B1 | 11/2001 | Ackley | 235/462.01 |
| 6,327,972 B2 | 12/2001 | Heredia et al. | 101/35 |
| 6,360,208 B1 | 3/2002 | Ohanian et al. | 705/31 |
| 6,371,375 B1 | 4/2002 | Ackley et al. | 235/462.45 |
| 6,409,401 B1 | 6/2002 | Petteruti et al. | 400/88 |
| 6,422,476 B1 | 7/2002 | Ackley | 235/494 |
| 6,512,482 B1 * | 1/2003 | Nelson et al. | 343/700 MS |
| 6,570,386 B2 | 5/2003 | Goldstein | 324/415 |
| 6,585,159 B1 | 7/2003 | Meier et al. | 235/462.31 |
| 6,585,437 B1 | 7/2003 | Wiklof et al. | 400/621 |
| 6,593,853 B1 | 7/2003 | Barrett et al. | 340/572.1 |
| 6,664,897 B2 | 12/2003 | Pape et al. | 340/573.3 |
| 6,677,852 B1 | 1/2004 | Landt | 340/10.1 |
| 6,707,376 B1 * | 3/2004 | Patterson et al. | 340/10.3 |
| 6,899,476 B1 | 5/2005 | Barrus et al. | 400/76 |
| 6,917,291 B2 | 7/2005 | Allen | 340/572.1 |
| 6,933,848 B1 * | 8/2005 | Stewart et al. | 340/572.3 |
| 6,967,577 B2 | 11/2005 | Taylor et al. | 340/572.1 |
| 7,071,825 B2 | 7/2006 | VoBa | 340/572.1 |
| 7,121,467 B2 | 10/2006 | Winter et al. | 235/462.2 |
| 7,259,676 B2 | 8/2007 | Knadle, Jr. et al. | 340/572.4 |
| 7,323,977 B2 | 1/2008 | Kodukula et al. | 340/505 |

| | | | | |
|---|---|---|---|---|
| 7,323,989 | B2 | 1/2008 | Allen | 340/572.1 |
| 7,413,124 | B2 | 8/2008 | Frank et al. | 235/451 |
| 7,423,539 | B2 * | 9/2008 | Hyde et al. | 340/572.4 |
| 7,499,648 | B2 | 3/2009 | Draper et al. | 398/37 |
| 7,528,728 | B2 * | 5/2009 | Oliver et al. | 340/572.8 |
| 7,546,955 | B2 | 6/2009 | Marty et al. | 235/470 |
| 7,579,955 | B2 | 8/2009 | Pillai | |
| 7,667,589 | B2 * | 2/2010 | Desmons et al. | 340/522 |
| 7,893,813 | B2 | 2/2011 | Nikitin et al. | 340/10.1 |
| 2001/0048361 | A1 | 12/2001 | Mays et al. | 340/10.51 |
| 2003/0012168 | A1 | 1/2003 | Elson et al. | 370/338 |
| 2003/0218069 | A1 | 11/2003 | Meier et al. | 235/462.25 |
| 2004/0166807 | A1 | 8/2004 | Vesikivi et al. | 455/41.2 |
| 2005/0052279 | A1 | 3/2005 | Bridgelall | 340/10.1 |
| 2005/0057370 | A1 | 3/2005 | Warrior et al. | 340/870.01 |
| 2005/0120260 | A1 | 6/2005 | Suzuki et al. | 714/5 |
| 2005/0212674 | A1 | 9/2005 | Desmons et al. | 340/572.7 |
| 2006/0022801 | A1 | 2/2006 | Husak et al. | 340/10.5 |
| 2006/0028343 | A1 | 2/2006 | Taylor et al. | 340/572.1 |
| 2006/0267731 | A1 | 11/2006 | Chen | 340/10.1 |
| 2007/0017983 | A1 | 1/2007 | Frank et al. | 235/385 |
| 2007/0024423 | A1 | 2/2007 | Nikitin et al. | 340/10.1 |
| 2007/0081671 | A1 | 4/2007 | Ross, Jr. et al. | 380/255 |
| 2007/0194929 | A1 | 8/2007 | Wagner et al. | |
| 2007/0296582 | A1 | 12/2007 | Rofougaran | 340/572.1 |
| 2007/0296583 | A1 | 12/2007 | Rofougaran | 340/572.1 |
| 2008/0188209 | A1 | 8/2008 | Dorogusker et al. | 455/414.2 |
| 2008/0231451 | A1 | 9/2008 | Kamel | 340/572.1 |
| 2008/0252424 | A1 | 10/2008 | Maltseff et al. | 340/10.1 |
| 2009/0272812 | A1 | 11/2009 | Marty et al. | 235/470 |

FOREIGN PATENT DOCUMENTS

| | | |
|---|---|---|
| EP | 0 595 549 A2 | 5/1994 |
| EP | 0 667 592 A1 | 8/1995 |
| EP | 0 718 912 A1 | 6/1996 |
| FR | 2 760 209 A1 | 9/1998 |
| JP | 3-113673 A | 5/1991 |
| JP | 10-40329 A | 2/1998 |
| JP | 11-221948 | 8/1999 |
| WO | WO 95/12863 A1 | 5/1995 |
| WO | WO 96/13803 A1 | 5/1996 |
| WO | WO 98/47101 A2 | 10/1998 |
| WO | WO 2007/035863 | 3/2007 |

OTHER PUBLICATIONS

"Alien Squiggle Family of EPC RFID Tags," Alien Technology Corporation, 2005, pp. 1-2.

Atmel Microcontroller with Transponder Interface manual, U9280M-H, 2005.

"AXCESS: Radio Frequency Identification Overview," http://www.axcessinc.com/prod_rfidoverview.php, download date Sep. 13, 2006, pp. 1-3.

K.V. Rao et al., "Antenna Design for UHF RFID Tags: A Review and a Practical Application," *IEEE Transactions on Antennas and Propagation*, vol. 53, No. 12, Dec. 2005, pp. 3870-3876.

Kirman et al., "Stochastic Communication and Coalition Formation," Economitica, vol. 54, No. 1, (Jan. 1986), pp. 129-138.

"Radio-Frequency Identification of Animals—Code Structure," ISO 11784, Second Edition, Aug. 15, 1996.

"Radio-Frequency Identification of Animals—Code Structure—Amendment 1," ISO 11784, Second Edition, Aug. 15, 1996, Amendment 1, Nov. 15, 2004.

"Radio-Frequency Identification of Animals—Technical Concept," ISO 11785, First Edition, Oct. 15, 1996.

"RFID Tags by RFIDSupplyChain.com," URL: http://www.rfidsupplychain.com/Categories.bok?category=RFID+Tags, 2006, download date Jun. 22, 2006, pp. 1-3.

U.S. Appl. No. 11/464,038, filed Aug. 11, 2006, Pillai.

U.S. Appl. No. 11/775,088, filed Jul. 9, 2007, Ackley et al.

U.S. Appl. No. 60/719,102, filed Sep. 21, 2005, Maltseff et al.

U.S. Appl. No. 60/830,020, filed Jul. 11, 2006, Ackley et al.

U.S. Appl. No. 60/834,314, filed Jul. 28, 2006, Ackley et al.

"SMART DUST: Autonomous sensing and communication in a cubic millimeter," http://robotics.eecs.berkeley.edu/~pister/SmartDust/, download date Sep. 13, 2006, pp. 1-6.

Technical Specification: Aircraft-Integrated Data Processing Materials Management-Bar Coding, ISO/TS 21849, First Edition, Jul. 1, 2003.

"Information Technology—Radio Frequency Identification for Item Management: Part 6: Parameters for Air Interface Communications at 860 MHz to 960MHz," ISO/IEC 18000-6, First Edition, Aug. 15, 2004.

"International Technical Standard: Extended Channel Interpretations: Part 1: Identification Schemes and Protocol," AIM Publication ITS/04-001 (May 24, 2004).

"International Symbology Specification—93i," AIM Publication ITS/99-004, Nov. 5, 1999.

"Information Technology—Automatic Identification and Data Capture Techniques—Bar Code Symbology Specifications," International Standard ISO/IEC 15438, First Edition, Sep. 15, 2001.

"Information Technology: Transfer Syntax for High Capacity ADC Media," International Standard ISO/IEC 15434, First Edition, Oct. 1, 1999.

Maltseff et al., Synchronization of Adaptive Self-Configuring Wireless Network of Transponders U.S. Appl. No. 60/610,759, filed Dec. 1, 2004, 5 pages.

Ackley, "Method, Apparatus and Character Set for Encoding Information About Associated Data Carriers, Such As RFID Tags," U.S. Appl. No. 09/375,815, filed Aug. 17, 1999, 40 pages.

Ackley, "Computer Readable Character Set for Encoding Data in Data Carriers, Such As RFID Tags," U.S. Appl. No. 09/375,913, filed Aug. 17, 1999, 47 pages.

AIM International, Inc., "International Symbology Specification—Data Matrix," May 8, 1997, 95 pages.

AIM International, Inc., "International Symbology Specification—MaxiCode," May 8, 1997, 44 pages.

AIM International, Inc., "International Technical Specification—Symbology Identifiers," AIM International ITS 98-002, Document Version 1.0, Jun. 18, 1998, 17 pages.

AIM USA, "Uniform Specification—Code 93," Apr. 1993, 11 pages.

AIM USA, "Uniform Specification—Code One," Jul. 1994, 32 pages.

AIM USA, "Uniform Symbology Specification—PDF417," Jul. 1994, and International Product Code (IPC)-2D Symbology Specification, Version: Sep. 7, 1997, 34 pages.

AIM USA, "Uniform Symbology Specification—Code 16K," American National Standards Institute, Inc., Approved Aug. 16, 1995, 17 pages.

AIM USA, "Uniform Symbology Specification—Code 49," American National Standards Institute, Inc., Approved Aug. 16, 1995, 26 pages.

AIM USA, "Uniform Symbology Specification—Code 128," American National Standards Institute, Inc., Approved Aug. 16, 1995, 12 pages.

AIM USA, "Uniform Symbology Specification—Code 39," American National Standards Institute, Inc., Approved Aug. 16, 1995, 11 pages.

AIM USA, "Uniform Symbology Specification—Interleaved 2-of-5," American National Standards Institute, Inc., Approved Aug. 16, 1995, 11 pages.

AIM USA, "Uniform Symbology Specification13 Codabar," American National Standards Institute, Inc., Approved Aug. 16, 1995, 11 pages.

AIM USA, "Uniform Symbology Specification—Code 93," American National Standards Institute, Inc., Approved Aug. 16, 1995, 10 pages.

AIM USA, "Understanding 2d Symbologies, a Detailed Overview and Technical Introduction," 1999, 49 pages.

"Alphanumeric Data Compaction," Intermec Corporation, Everett, Washington, 1992, 6 pages.

Arthur, NN11102407, IBM Technical Disclosure Bulletin 24(5): Oct. 1981, 2 pages.

"Bar Code Decompression," IBM Technical Disclosure Bulletin 32(12):288-290, May 1990, 3 pages.

"Bar Code Print Quality—Guideline," American National Standards Institute, ANSI X3.182-1990, 1990, 32 pages.

Businessworld, "Cigarette firms complain barcode requirement is 'too costly'" Manila, Nov. 30, 1998, 1 page.

"Codablock F (128)" Bar Coding—Symbology Specification—Codablock, ICS International AG, 1993, 48 pages.

Dallas Semiconductor, "Book of DS1999x Touch Memory Standards," 1992, 85 pages.

Dallas Semiconductor, "Dallas Takes the Memory Out of the Computer," Feb. 1993, 14 pages.

Dallas Semiconductor, "50 Ways to Touch Memory," Second Edition, Oct. 1992, 93 pages.

Dallas Semiconductor, "50 Ways to Touch Memory," Third Edition, Aug. 1994, 95 pages.

Extended Channel Interpretation (ECI) Assignments, Release 2, EXI Assignments, Jul. 1996, 15 pages.

"Going with the flow: The 1998 roundtable report," Material Handling Engineering 53(13):40-66, Cleveland, Dec. 1998, 18 pages.

"Information processing—8-bit single-byte coded graphic character sets—Part 1: Latin alphabet No. 1," International Standard, ISO 8859-1, First Edition, Feb. 15, 1987, 11 pages.

"Information processing—8-bit single-byte coded graphic character sets—Part 4: Latin alphabet No. 4," International Standard, ISO 8859-4, First Edition, Feb. 15, 1988, 13 pages.

IPC-2D Symbology Specification, Sep. 7, 1997, 8 pages.

IPC-13 Symbology Specification (preliminary), Sep. 4, 1997, 11 pages.

IPC-14 Symbology Specification (preliminary), Sep. 1, 1997, 10 pages.

NN86055595, IBM Technical Disclosure Bulletin 28(12):5595-5596, May 1986, 3 pages.

Palmer, *The Bar Code Book*, 2d ed., Helmers Publishing, Inc., New Hampshire, 1991, Chap. 4, "Symbologies," pp. 15-59. 23 pages.

Schuessler, "Using Extended Channel Interpretations (ECI's) for International Character Set Standardization," Scan-Tech Proceedings, Chicago, IL, Nov. 1996, pp. 294-305. 12 pages.

The Unicode Standard—Worldwide Character Encoding—Version 1.0, vol. 1, The Unicode Consortium, Addison-Wesley Publishing Company, Inc., Massachusetts, 1991, pp. 1-6; 340. 9 pages.

Walker, "ASCII-based compaction eases bar-code decoder's work," Electronic Design 30(22):163-166, Oct. 1982. 4 pages.

Wang, "PDF417 Specification," Symbol Technologies, Inc., 1991, 50 pages.

Wiklof et al., "Data Carrier, Such As RFID Tag, With Associated Carrier Error Correction," U.S. Appl. No. 09/328,028, filed Jun. 8, 1999, 45 pages.

\* cited by examiner

AUTOMATIC DATA COLLECTION DEVICE, METHOD AND ARTICLE

BACKGROUND OF THE INVENTION

1. Field of the Invention

This disclosure generally relates to automatic data collection (ADC) and more particularly to radio-frequency identification.

2. Description of the Related Art

The ADC field is generally directed to the use of devices and methods for automatically capturing data typically encoded in data carriers such as machine-readable symbols or radio-frequency identification (RFID) tags carried by the item to which the data relates. An ADC device may be embedded in a carrier, such as a metal or plastic carrier, or in an item, such as an asset, to which the data relates. A variety of ADC devices and ADC media are ubiquitous and well known, and are often used for tracking inventory.

RFID tags typically include an RFID substrate carrying a circuitry such as a semiconductor device including memory and one or more conductive traces that form an antenna. Typically, RFID tags act as transponders, providing information stored in the semiconductor device in response to a radio-frequency (RF) signal, commonly referred to as an interrogation signal, received at the antenna from a reader or interrogator. Some RFID tags include security measures, such as passwords and/or encryption. Many RFID tags also permit information to be written or stored in the semiconductor memory via an RF signal. As used herein, radio-frequency communications include communications in any frequency band or range suitable for wireless communications, including those commonly referred to as the radio wavelength and the microwave wavelength portions of the electromagnetic spectrum.

RFID tags that include a discrete power source, for example a battery, are commonly referred to as active devices. RFID devices that rely on an RF signal to derive power are commonly referred to as passive devices. RFID tags may employ both active and passive power sources.

An RFID tag may fail, which can lead to substantial costs particularly when the RFID tag is used to control inventory or when the RFID tag is embedded in an expensive carrier or in the item to which the data relates.

BRIEF SUMMARY OF THE INVENTION

In one aspect, a radio frequency identification system comprises a radio-frequency identification substrate and an interrogator. In one embodiment, the radio-frequency identification substrate comprises a plurality of radio-frequency identification devices. In one embodiment, a first radio-frequency identification device on the substrate monitors an indication of a response of a second radio-frequency identification device on the substrate to an interrogation signal and selectively responds to the interrogation signal based on the monitoring of the indication.

In one aspect, a radio-frequency identification tag comprises a substrate, a first radio-frequency identification device carried by the substrate and configured to respond to an interrogation signal, and a second radio-frequency identification device carried by the substrate and electrically coupled to the first radio-frequency identification device, and configured to monitor an indication of a response of the first radio-frequency identification device to the interrogation signal, and selectively respond to the interrogation signal based on the monitoring of the indication. In one embodiment, the radio-frequency identification tag further comprises a controller configured to selectively generate control signals to cause the second radio-frequency identification device to respond to the interrogation signal when the monitoring indicates the first radio-frequency identification device failed to respond to the interrogation signal. In one embodiment, the first radio-frequency identification device is configured to generate the monitored indication. In one embodiment, the first radio-frequency identification device comprises a first integrated circuit carried by the substrate. In one embodiment, the second radio-frequency identification device comprises a second integrated circuit carried by the substrate. In one embodiment, the second integrated circuit is identical to the first integrated circuit. In one embodiment, the indication of the response is an indication that the first radio-frequency identification device executed a time-out in response to the interrogation signal. In one embodiment, the indication of the response is an indication that the interrogation signal was not directed to the radio-frequency identification tag. In one embodiment, the indication of the response is an indication that the first radio-frequency identification device initialized in response to the interrogation signal. In one embodiment, the monitoring comprises determining whether the first radio-frequency identification device correctly responded to the interrogation signal. In one embodiment, the radio-frequency identification tag further comprises an antenna system electrically coupled to the first and second radio-frequency identification devices. In one embodiment, the antenna system comprises a first antenna electrically coupled to the first radio-frequency identification device, and a second antenna electrically coupled to the second radio-frequency identification device. In one embodiment, the first radio-frequency identification device comprises an antenna system.

In another aspect, an asset comprises an antenna system, a first radio-frequency identification device electrically coupled to the antenna system and configured to respond to an interrogation signal, and a second radio-frequency identification device electrically coupled to the antenna system and to the first radio-frequency identification device and configured to monitor an indication of a response of the first radio-frequency identification device to the interrogation signal, and selectively respond to the interrogation signal based on the monitoring of the indication. In one embodiment, the first radio-frequency identification device is configured to generate the monitored indication. In one embodiment, the first radio-frequency identification device comprises a first integrated circuit. In one embodiment, the second radio-frequency identification device comprises a second integrated circuit identical to the first integrated circuit. In one embodiment, the asset further comprises a third radio-frequency identification device electrically coupled to the antenna system and to the second radio-frequency identification device and configured to monitor an indication of a response of the second radio-frequency identification device to the interrogation signal, and selectively respond to the interrogation signal based on the monitoring of the indication of the response of the second radio-frequency identification device.

In another aspect, a radio-frequency identification substrate comprises an antenna system coupled to the substrate, a first radio-frequency identification device, and a second radio-frequency identification device coupled to the first radio-frequency identification device and configured to, in a first mode of operation, monitor a response of the first radio-frequency identification device to an interrogation signal and selectively respond to the interrogation signal based on the monitoring of the response, and in a second mode of operation, respond to the interrogation signal. In one embodiment, the second radio-frequency identification device is further configured to selectively disable the first radio-frequency identification device. In one embodiment, the disabling of the first radio-frequency identification device is temporary. In one embodiment, the second radio-frequency identification device is disabled in a third mode of operation. In one embodiment, the radio-frequency identification substrate further comprises a mode controller coupled to the first radio-frequency identification device and configured to generate control signals to control the mode of operation of the second radio-frequency identification device.

In another aspect, a radio-frequency identification system comprises an interrogator configured to generate a signal, and an asset comprising means for receiving the signal, first means for selectively responding to the signal electrically coupled to the means for receiving the signal, redundant means for selectively responding to the signal electrically coupled to the means for receiving the signal, and means for determining whether the first means for selectively responding to the signal responded to the signal electrically coupled to the first means for selectively responding to the signal and to the redundant means for selectively responding to the signal. In one embodiment, the radio-frequency identification system further comprises a first integrated circuit comprising the first means for selectively responding to the signal, and a second integrated circuit comprising the redundant means for selectively responding to the signal. In one embodiment, the second integrated circuit further comprises the means for determining whether the first means for selectively responding to the signal responded to the signal. In one embodiment, the radio-frequency identification system further comprises a substrate coupled to the asset wherein the means for receiving the signal, the first means for selectively responding to the signal, the redundant means for selectively responding to the signal, and the means for determining whether the first means for selectively responding to the signal responded to the signal are carried by the substrate. In one embodiment, the radio-frequency identification system further comprises second redundant means for selectively responding to the signal coupled to the means for receiving the signal and comprising means for processing an indication of a response to the signal by the asset. In one embodiment, the means for processing the indication of the response to the signal by the asset is configured to monitor an indication of a response by the first means for selectively responding to the signal.

In another aspect, an integrated circuit comprises means for receiving a radio-frequency interrogation signal, means for selectively responding to the received radio-frequency interrogation signal electrically coupled to the means for receiving the radio-frequency interrogation signal, and means for receiving a control signal to control the means for selectively responding to the received radio-frequency interrogation signal, wherein the means for receiving the control signal is separate from the means for receiving a radio-frequency interrogation signal. In one embodiment, the integrated circuit further comprises means for generating a signal indicative of a response to the interrogation signal by the means for selectively responding to the received interrogation signal. In one embodiment, the means for receiving a radio-frequency interrogation signal comprises a first pin on the integrated circuit. In one embodiment, the means for receiving a control signal comprises a second pin on the integrated circuit.

In another aspect, a method of responding to an interrogation signal being performed by a first radio-frequency identification device comprises receiving the interrogation signal, and when the first radio-frequency identification device is configured to operate in a first mode of operation, generating a response to the interrogation signal, and generating an indication of the response to the interrogation signal by the first radio-frequency identification device.

In one embodiment, the method further comprises, when the first radio-frequency identification device is configured to operate in a second mode of operation, monitoring an indication of a second radio-frequency identification device responding to the interrogation signal, and selectively generating the response to the interrogation signal based on the indication. In one embodiment, monitoring the indication of the second radio-frequency identification device responding to the interrogation signal comprises determining whether the second radio-frequency device correctly responded to the interrogation signal.

In one embodiment, the method further comprises, when the first radio-frequency identification device is configured to operate in a third mode of operation, disregarding the interrogation signal. In one embodiment, generating the response to the interrogation signal comprises executing a time-out in response to the interrogation signal. In one embodiment, generating the indication of the response to the interrogation signal by the first radio-frequency identification device comprises generating an indication that the radio-frequency identification signal was not directed to the first radio-frequency identification device. In one embodiment, generating the indication of the response to the interrogation signal by the first radio-frequency identification device comprises generating an indication that the first radio-frequency identification device initialized in response to the interrogation signal.

In one embodiment, the method further comprises determining whether the interrogation signal was directed to the first radio-frequency communication device. In one embodiment, determining whether the interrogation signal was directed to the first radio-frequency identification device comprises extracting a code from the interrogation signal.

In one embodiment, the method further comprises generating a signal to disable a second radio-frequency identification device. In one embodiment, the method further comprises authenticating the interrogation signal. In one embodiment, the method further comprises maintaining a state table.

In another aspect, a method of responding to an interrogation signal being performed by a first radio-frequency identification device comprises receiving the interrogation signal, and when the first radio-frequency identification device is configured to operate in a redundant mode of operation, monitoring an indication of a second radio-frequency identification device responding to the interrogation signal, and selectively generating a response to the interrogation signal based on the indication. In one embodiment, monitoring the indication of the second radio-frequency identification device responding to the interrogation signal comprises determining whether the second radio-frequency device correctly responded to the interrogation signal.

In one embodiment, the method further comprises, when the first radio-frequency identification device is configured to operate in a time-out mode of operation, disregarding the interrogation signal.

In one embodiment, the method further comprises, when the first radio-frequency identification device is configured to operate in a primary mode of operation, generating the response to the interrogation signal.

In another aspect, a computer-readable medium containing contents that cause a first radio-frequency identification device to process an interrogation signal by performing a method comprising receiving the interrogation signal, when the first radio-frequency identification device is configured to operate in a first mode of operation, generating a response to the interrogation signal, and generating an indication of the response to the interrogation signal by the first radio-frequency identification device, when the first radio-frequency identification device is configured to operate in a second mode of operation, monitoring an indication of a second radio-frequency identification device responding to the interrogation signal, and selectively generating the response to the interrogation signal based on the indication, and when the first radio-frequency identification device is configured to operate in a third mode of operation, disregarding the interrogation signal. In one embodiment, the contents are instructions stored in a memory.

In another aspect, an integrated circuit comprises a first external interface to receive a radio-frequency interrogation signal, a second external interface configured to electrically couple the integrated circuit to another integrated circuit, and a data system coupled to the first external interface and to the second external interface, and configurable to selectively respond to the received radio-frequency interrogation signal. In one embodiment, the data system is further configurable to generate a control signal and the second external interface is configurable to output the control signal. In one embodiment, the second external interface is configurable to receive a control signal and the data system is configured to selectively respond to the received interrogation signal based on the received control signal. In one embodiment, the first external interface comprises a first pin on the integrated circuit. In one embodiment, the second external interface comprises a second pin on the integrated circuit. In one embodiment, the data system comprises a mode controller.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

DETAILED DESCRIPTION OF THE INVENTION

In the following description, certain details are set forth in order to provide a thorough understanding of various embodiments of devices, methods and articles. However, one of skill in the art will understand that other embodiments may be practiced without these details. In other instances, well-known structures and methods associated with RFID tags, RFID devices, RFID substrates, semiconductor devices, interrogators, RF signals, and antennas have not been shown or described in detail to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is as "including, but not limited to."

Reference throughout this specification to "one embodiment," or "an embodiment" means that a particular feature, structure or characteristic described in connection with the embodiment is included in at least one embodiment. Thus, the appearances of the phases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claimed invention.

Figure 1:
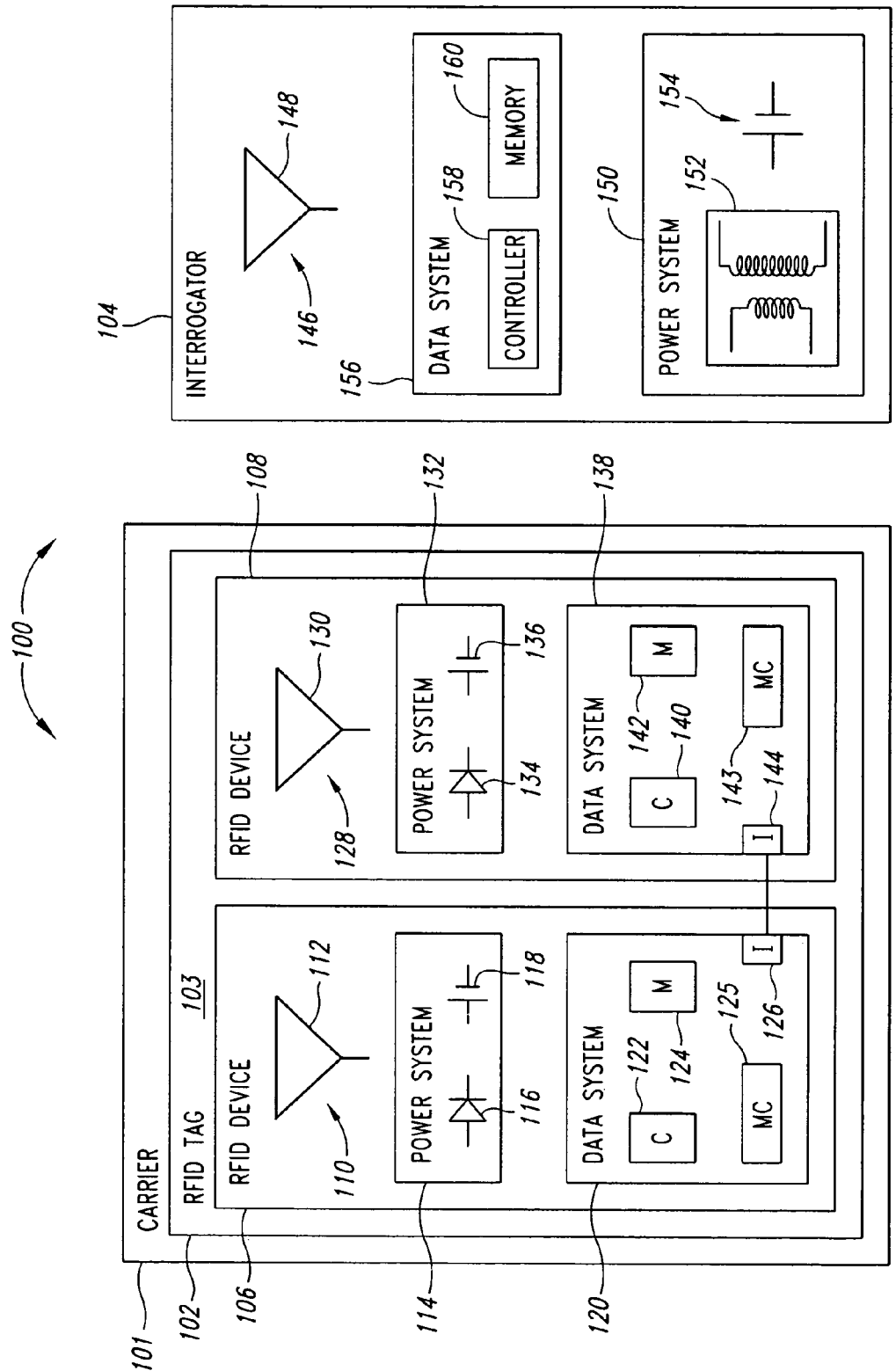
FIG. 1 is a functional block diagram of a radio-frequency identification system according to one illustrated embodiment.

FIG. 1 is a functional block diagram of an RFID system 100 comprising an RFID tag 102 and a reader or interrogator 104. The RFID tag 102 may, for example, take the form of a card. The RFID tag 102 comprises an RFID substrate 103. The substrate comprises a first RFID device or module 106 and a second or redundant RFID device or module 108. The RFID tag may be embedded in a carrier 101, for example, a metal carrier, a plastic carrier, or an item, such as an asset, to which the data relates.

The first RFID device 106 as illustrated comprises an antenna system 110, which as illustrated comprises an antenna 112. The antenna system 110 sends and receives radio frequency signals and may comprise multiple antennas, multiple antenna arms, and parasitic or directional elements. The first RFID device 106 as illustrated also comprises a power system 114, which as illustrated comprises an optional rectifier 116 and an optional battery 118. The power system 114 provides power to the first RFID device 106 and may be configured to provide power in a passive and/or an active manner. The first RFID device 106 also comprises a data system 120, which as illustrated comprises a controller 122, a memory 124, a mode controller 125 and a control interface 126. As discussed in more detail below, the data system 120 is configured to generate output signals in response to signals received from the antenna system 110 and/or via the control interface 126.

As discussed in more detail below, the mode controller 125 controls the mode of operation of the first RFID device 106. For example, in one mode of operation, the first RFID device 106 may be controlled so as to respond to an interrogation signal received from the interrogator 104. In another mode of operation, the first RFID device 106 may be controlled so as to monitor the response of the second RFID device 108 to an interrogation signal. In another mode of operation, the first RFID device 106 may be disabled. In some embodiments, the data system 120 may comprise discrete circuitry in addition to, or instead of, the illustrated controller 122, memory 124 and/or mode controller 125.

The second RFID device 108 as illustrated comprises an antenna system 128, which as illustrated comprises an antenna 130. The antenna system 128 sends and receives radio frequency signals and may comprise multiple antennas, multiple antenna arms, and parasitic or directional elements. The second RFID device 108 as illustrated also comprises a power system 132, which as illustrated comprises an optional rectifier 134 and an optional battery 136. The power system 132 provides power to the second RFID device 108 and may be configured to provide power in a passive and/or an active manner. The second RFID device 108 also comprises a data system 138, which as illustrated comprises a controller 140, a memory 142, a mode controller 143, and a control interface 144. As discussed in more detail below, the data system 138 is configured to generate output signals in response to signals received from the antenna system 128 and/or via the control interface 144. In some embodiments, the data system 138 may comprise discrete circuitry in addition to, or instead of, the illustrated controller 140, memory 142 and/or mode controller 143.

As discussed in more detail below, the mode controller 143 controls the mode of operation of the second RFID device 108. For example, in one mode of operation, the second RFID device 108 may be controlled so as to respond to an interrogation signal received from the interrogator 104. In another mode of operation, the second RFID device 108 may be controlled so as to monitor the response of the first RFID device 106 to an interrogation signal. In another mode of operation, the second RFID device 108 may be disabled. In some embodiments, the data system 138 may comprise discrete circuitry in addition to, or instead of, the illustrated controller 140, memory 142 and/or mode controller 143. The control interface 126 of the first RFID device 106 is coupled to the control interface 144 of the second RFID device 108.

The first and second RFID devices 106, 108 of the RFID tag 102 need not have separate, incorporated antenna systems, power systems and data systems, but may, for example, share one or more modules and/or systems in some embodiments, which may or may not be integrated into one of the first or second RFID devices 106, 108. For example, a single shared antenna system may be employed in some embodiments (see FIGS. 2 and 3). The power systems 114, 132, need not have both active and passive sources. For example, the power system 114 of the first RFID device 106 may have a passive power source while the power system 132 of the second RFID device 108 may have an active power source.

The interrogator 104 comprises an antenna system 146, which as illustrated comprises an antenna 148. The antenna system 146 sends and receives radio frequency signals and may comprise multiple antennas, multiple antenna arms, and parasitic or directional elements. The interrogator 104 as illustrated also comprises a power system 150, which as illustrated comprises a power conditioner 152 for conditioning external power sources and an optional battery 154. The power system 150 provides power to the interrogator 104. The interrogator 104 also comprises a data system 156, which as illustrated comprises a controller 158, a memory 160. In some embodiments, the data system 156 may comprise discrete circuitry in addition to, or instead of, the illustrated controller 158 and/or the memory 160.

The respective data systems 120, 138, 156 may be implemented in a variety of ways, including as separate subsystems. Each of the data systems 120, 138, 156 may be implemented as a microprocessor, a digital signal processor (DSP), an application-specific integrated circuit (ASIC), or the like, or as a series of instructions stored in a memory, such as the memory 124, the memory 142, or the memory 160, and executed by a controller, such as the controller 122, the controller 140, or the controller 158, or various combinations of the above. Similarly, the respective mode controllers 225, 243 may be implemented in a variety of ways, including as separate subsystems. Each of the mode controllers 225, 243 may be implemented as a microprocessor, a digital signal processor (DSP), an application-specific integrated circuit (ASIC), or the like, or as a series of instructions stored in a memory, such as the memory 124, the memory 142, or the memory 160, and executed by a controller, such as the controller 122, the controller 140, or the controller 158, or various combinations of the above. Thus, software modifications to existing hardware may allow the implementation of the RFID system 100.

Various subsystems, such as the mode controller 125 of the first RFID device 106, are identified as separate blocks in the functional block diagram of FIG. 1 because they perform specific functions that will be described in more detail below. These subsystems may be discrete units. For example, the mode controller 125 of the first RFID device may be implemented with a discrete circuit. The subsystems also may not be discrete units but may be functions of a software routine, which will probably, but not necessarily, be separately callable and hence identifiable elements. For example, the mode controller 125 of the first RFID device 106 may be implemented by a software routine stored in the memory 124 and executed by the controller 122. The various subsystems may be combined. For example, in some embodiments all or portions of the mode controller 125 of the first RFID device 106 may be integrated into the mode controller 143 of the second RFID device 108. In some embodiments, the RFID tag 102 may employ a single mode controller to control the modes of operation of the first and second RFID devices 106, 108. A single mode controller may be separate from the first and second RFID devices 106, 108 or may be integrated into one of the first and second RFID devices.

Figure 2:
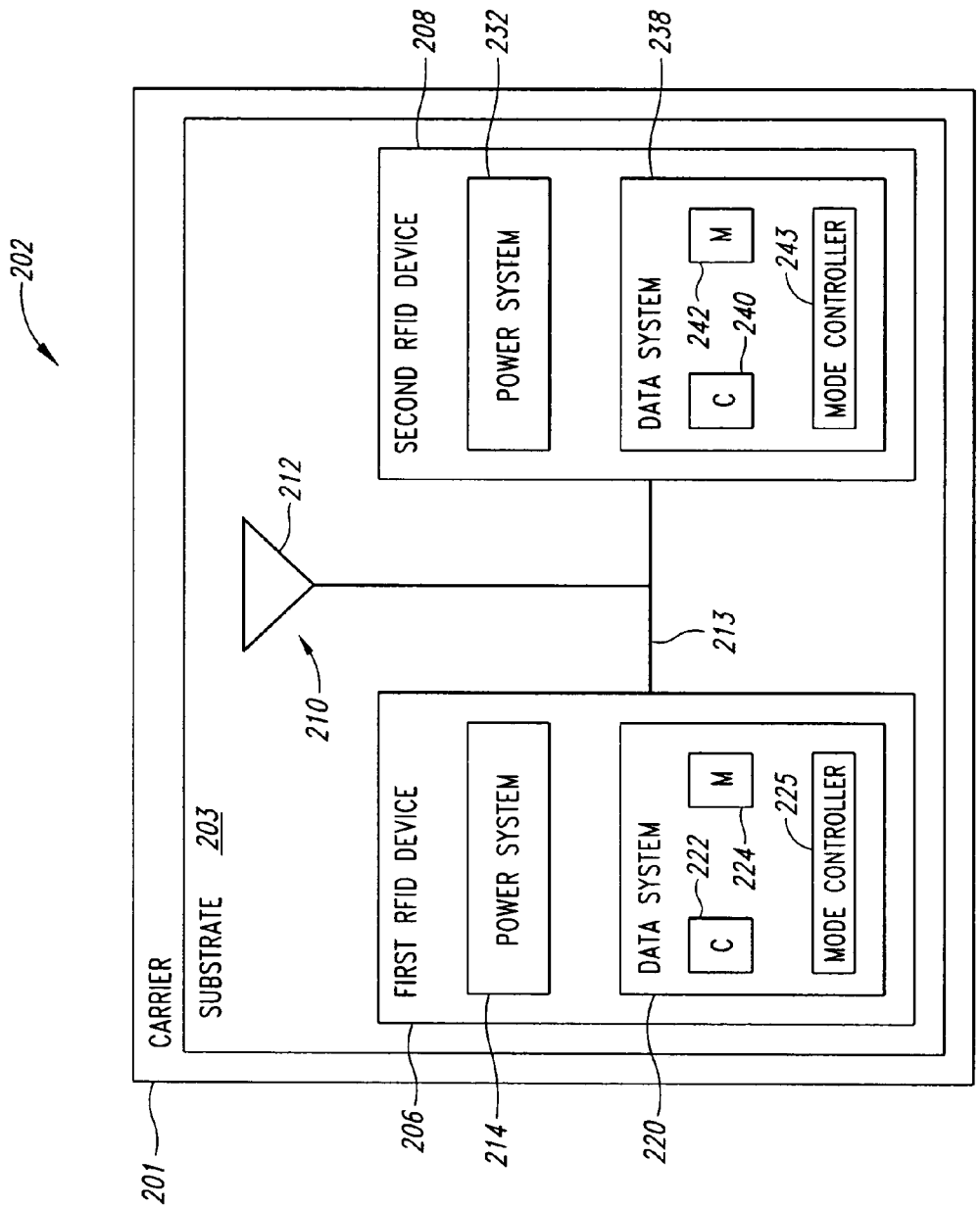
FIG. 2 is a functional block diagram of a radio-frequency identification tag according to another illustrated embodiment.

FIG. 2 is a functional block diagram of another embodiment of an RFID tag 202. The RFID tag 202 comprises a substrate 203, a first RFID device or module 206, a second or redundant RFID device or module 208, an antenna system 210 and a bus system 213. The substrate 203 is embedded in a carrier 201.

The first RFID device 206 as illustrated comprises a power system 214. The power system 214 provides power to the first RFID device 206 and may be configured to provide power in a passive and/or an active manner. The first RFID device 206 also comprises a data system 220, which as illustrated comprises a controller 222, a memory 224, and a mode controller 225. As discussed in more detail below, the data system 220 is configured to generate output signals in response to signals received from the antenna system 210 and/or the second RFID device 208. In some embodiments, the data system 220 may comprise discrete circuitry in addition to, or instead of, the illustrated controller 222, memory 224 and/or mode controller 225.

As discussed in more detail below, the first RFID device 206 may be configured to operate in various modes of operation. For example, in one mode of operation, the first RFID device 206 may be controlled so as to selectively respond to an interrogation signal received from an interrogator, such as the interrogator 104 illustrated in FIG. 1. In another mode of operation, the first RFID device 206 may be controlled so as to monitor the response of the second RFID device 208 to an interrogation signal. In another mode of operation, the first RFID device 206 may be disabled.

The second RFID device 208 as illustrated comprises a power system 232. The power system 232 provides power to the second RFID device 208 and may be configured to provide power in a passive and/or an active manner. The second RFID device 208 also comprises a data system 238, which as illustrated comprises a controller 240, a memory 242, and a mode controller 243. As discussed in more detail below, the data system 238 is configured to generate output signals in response to signals received from the antenna system 210 and/or the first RFID device 206. In some embodiments, the data system 238 may comprise discrete circuitry in addition to, or instead of, the illustrated controller 240, memory 242 and/or mode controller 243.

As discussed in more detail below, the second RFID device 208 may be configured to operate in various modes of operation. For example, in one mode of operation, the second RFID device 208 may be controlled so as to respond to an interrogation signal received from an interrogator, such as the interrogator 104 illustrated in FIG. 1. In another mode of operation, the second RFID device 208 may be controlled so as to monitor the response of the first RFID device 206 to an interrogation signal. In another mode of operation, the second RFID device 208 may be disabled.

The antenna system 210 as illustrated comprises an antenna 212. The antenna system 210 sends and receives radio frequency signals and may comprise multiple antennas, multiple antenna arms, and parasitic or directional elements. The bus system 213 may comprise various buses such as a data bus, a power bus and a control bus. For ease of illustration, the various buses are illustrated as the bus system 213.

The respective data systems 220, 238 and/or the mode controllers 225, 243 may be implemented in a variety of ways, including as separate subsystems. Each of the data systems 220, 238 and/or mode controllers 225, 243 may be implemented as a microprocessor, a digital signal processor (DSP), an application-specific integrated circuit (ASIC), or the like, or as a series of instructions stored in a memory, such as the memory 224 or the memory 242, and executed by a controller, such as the controller 222 or the controller 240, or various combinations of the above. Thus, software modifications to existing hardware may allow the implementation of the RFID tag 202. Various subsystems, such as the mode controller 225 of the first RFID device 206, are identified as separate blocks in the functional block diagram of FIG. 2 because they perform specific functions that will be described in more detail below. These subsystems may be discrete units. For example, the mode controller 225 of the first RFID device may be implemented with a discrete circuit. The subsystems also may not be discrete units but may be functions of a software routine, which will probably, but not necessarily, be separately callable and hence identifiable elements. The various subsystems may be combined. For example, in some embodiments all or portions of the mode controller 225 of the first RFID device 206 may be integrated into the mode controller 243 of the second RFID device 208.

Figure 3:
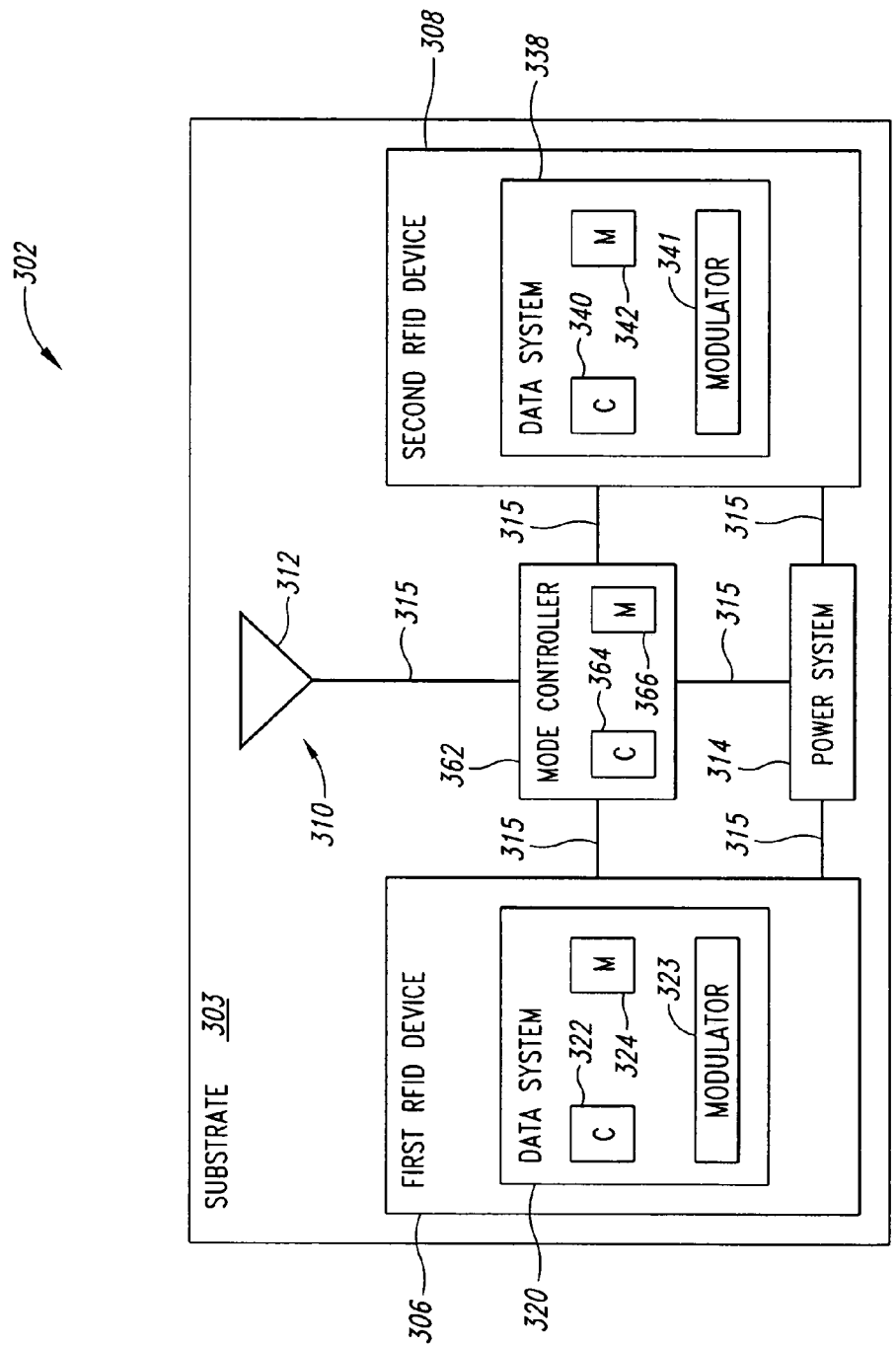
FIG. 3 is a functional block diagram of a radio-frequency identification tag according to yet another illustrated embodiment.

FIG. 3 is a functional block diagram of another embodiment of an RFID tag 302. The RFID tag 302 comprises a substrate 303, a first RFID device or module 306, a second or redundant RFID device or module 308, an antenna system 310, a power system 314, a bus system 315, and a mode controller 362. The power system 314 provides power to the RFID tag 302 and may be configured to provide power in a passive and/or an active manner.

The first RFID device 306 as illustrated comprises a data system 320, which comprises a controller 322, a memory 324, and a modulator 323. As discussed in more detail below, the data system 320 is configured to generate output signals in response to signals received from the antenna system 310 and/or the mode controller 362. In some embodiments, the data system 320 may comprise discrete circuitry in addition to, or instead of, the illustrated controller 322, memory 324 and/or modulator 325.

The second RFID device 308 as illustrated comprises a data system 338, which comprises a controller 340, a memory 342, and a modulator 341. As discussed in more detail below, the data system 338 is configured to generate output signals in response to signals received from the antenna system 310 and/or the mode controller 362. In some embodiments, the data system 338 may comprise discrete circuitry in addition to, or instead of, the illustrated controller 340, memory 342 and/or modulator 341.

As discussed in more detail below, the RFID tag 302 may be configured to operate in various modes of operation. For example, in one mode of operation, the second RFID device 308 may be controlled so as to respond to an interrogation signal received from an interrogator, such as the interrogator 104 illustrated in FIG. 1, while the first RFID device 306 may be controlled so as to respond to an interrogation signal in the event the second RFID device 308 fails to respond to the interrogation signal. In another mode of operation, the first RFID device 306 may be controlled so as to respond to an interrogation signal received from an interrogator, such as the interrogator 104 illustrated in FIG. 1, while the second RFID device 308 may be controlled so as to respond to an interrogation signal in the event the first RFID device 306 fails to respond to the interrogation signal. In another mode of operation, the first RFID device 306 may be controlled so as to respond to an interrogation signal, while the second RFID device 308 is disabled. In another mode of operation, the second RFID device 308 may be controlled so as to respond to an interrogation signal, while the first RFID device 306 is disabled.

The antenna system 310 as illustrated comprises an antenna 312. The antenna system 310 sends and receives radio frequency signals and may comprise multiple antennas, multiple antenna arms, and parasitic or directional elements. The bus system 315 may comprise various buses such as a data bus, a power bus and a control bus. For ease of illustration, the various buses are illustrated as the bus system 315.

The mode controller 362 as illustrated comprises a controller 364 and a memory 366. As discussed in more detail below, the mode controller 362 is configured to control the modes of operation of the first RFID device 306 and the second RFID device 308. In some embodiments, the mode controller 362 may comprise discrete circuitry in addition to, or instead of, the illustrated controller 364 and memory 366.

The respective data systems 320, 338 may be implemented in a variety of ways, including as separate subsystems. Each of the data systems 320, 338 may be implemented as a microprocessor, a digital signal processor (DSP), an application-specific integrated circuit (ASIC), or the like, or as a series of instructions stored in a memory, such as the memory 324 or the memory 342, and executed by a controller, such as the controller 322 or the controller 340, or various combinations of the above. Similarly, the mode controller 362 may be implemented in a variety of ways, including as separate subsystems. Thus, software modifications to existing hardware may allow the implementation of the RFID tag 302. Various subsystems, such as the mode controller 362, are identified as separate blocks in the functional block diagram of FIG. 3 because they perform specific functions that will be described in more detail below. These subsystems may be discrete units. For example, the mode controller 362 may be implemented with a discrete circuit. The subsystems also may not be discrete units but may be functions of a software routine, which will probably, but not necessarily, be separately callable and hence identifiable elements. The various subsystems may be combined. For example, in some embodiments all or portions of the mode controller 362 may be integrated into the antenna system 310.

Figure 4:
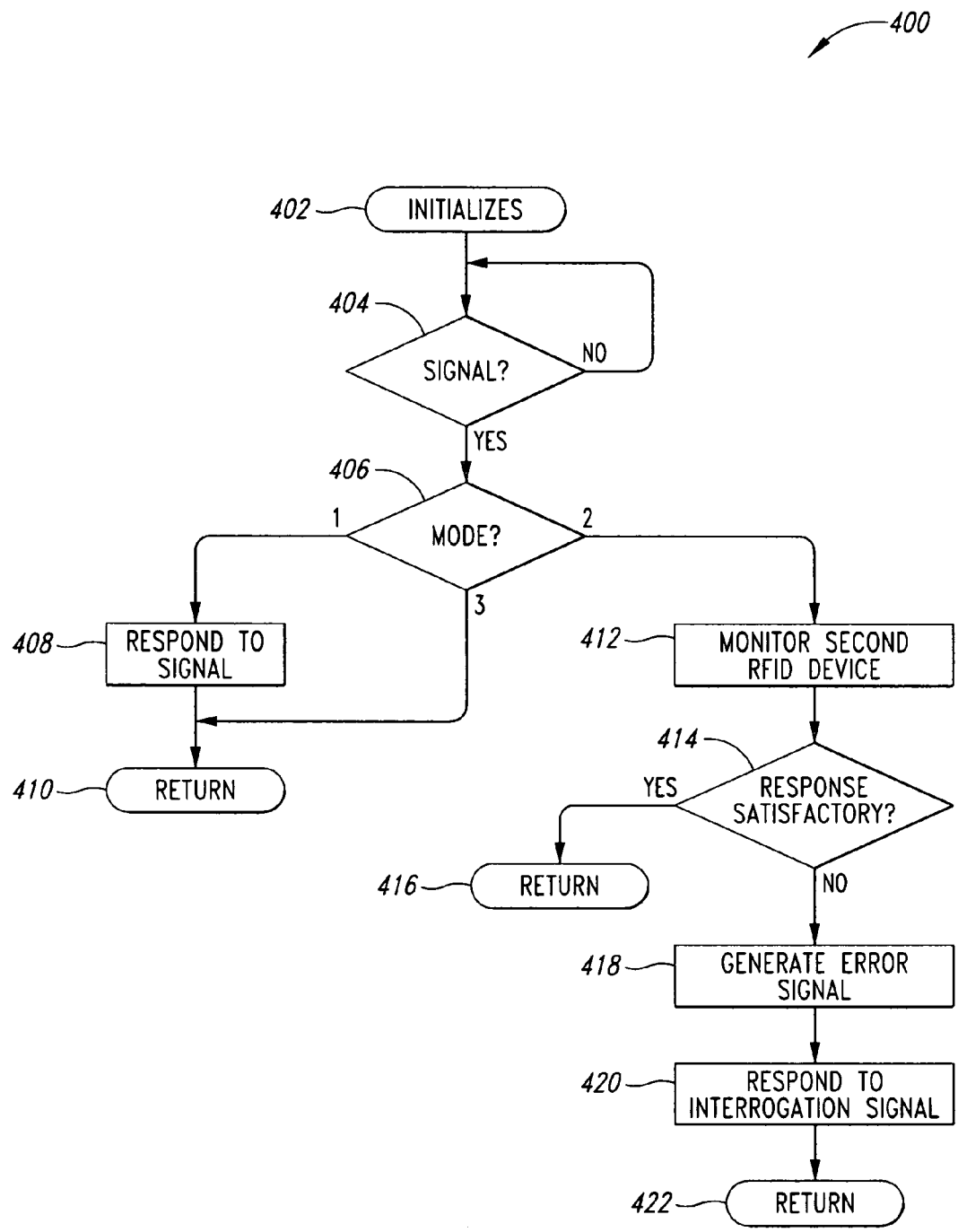
FIG. 4 is a high-level flow diagram showing a method of operating a radio-frequency identification system according to one illustrated embodiment.

FIG. 4 is a high-level flow diagram illustrating a method 400 of operating an RFID system, such as the RFID system 100 illustrated in FIG. 1, to provide redundancy in the event of a failure of one of the RFID devices 106, 108. Although the method 400 illustrated in FIG. 4 also may be used to operate other embodiments, such as the embodiments illustrated in FIGS. 2 and 3, and may be modified to facilitate such use, for convenience the method 400 will generally be described with reference to FIG. 1.

The method 400 initializes at 402 and proceeds to 404. At 404, the RFID tag 102 determines whether an interrogation signal is being received. When the RFID tag 102 determines that an interrogation signal is being received, the method 400 proceeds from 404 to 406. When the RFID tag 102 determines that an interrogation signal is not being received, the method 400 returns to 404. The interrogation signal may comprise, for example, a signal from an interrogator, such as the interrogator 104, which may comprise a command signal to cause the RFID tag 102 to, for example, generate a return signal to the interrogator 104, store or retrieve data, set or reset a mode of operation of an RFID device, such as the first RFID device 106, and/or generate a command signal.

At 406, the RFID tag 102 determines whether to operate the first RFID device 106 in a first, a second, or a third mode of operation. For example, as illustrated the first RFID device 106 is configured to respond to an interrogation signal in a first mode of operation, to stand-by in a second mode of operation, and to disregard the interrogation signal in a third mode of operation. The mode of operation may be determined, for example, by checking a value of a mode indicator stored in a memory, such as the memory 124 of FIG. 1, the memory 142 of FIG. 1, or the memory 366 illustrated in FIG. 3. A mode of operation of the first RFID device may be set, for example, during manufacture of the RFID tag 102, or it may be set or reset in response to received signals, such as a command signal from the interrogator 104, which may or may not be embedded in an interrogation signal, or a command signal from the second RFID device 108, or, with reference to FIG. 3, a command signal from the mode controller 362.

When it is determined at 406 that the first RFID device 106 is to operate in the first mode of operation, the method 400 proceeds from 406 to 408. At 408, the first RFID device 106 responds to the interrogation signal. The first RFID device 106 may respond to an interrogation signal by, for example, generating a return signal to the interrogator 104, storing or retrieving data, setting or resetting a mode of operation of an RFID device, such as the first RFID device 106, determining whether the interrogation signal is from an authorized interrogator, determining whether the interrogation signal is directed to the first RFID device 106, and/or generating a command signal. The method 400 proceeds from 408 to 410, where the method 400 terminates and returns the value of any desired variables.

When it is determined at 406 that the first RFID device 106 is to operate in the second mode of operation, the method 400 proceeds from 406 to 412. At 412, the RFID tag 102 monitors the response of the second RFID device 108 to the interrogation signal. This may comprise, for example, monitoring a signal from the second RFID device 108, monitoring whether the second RFID device 108 generates a response signal and/or monitoring the content of the response signal. In the embodiment illustrated in FIG. 1, for example, the first RFID device 106 may be configured to monitor the response of the second RFID device 108. In the embodiment illustrated in FIG. 2, for example, the first RFID device 206 may be configured to monitor the response of the second RFID device 208. In the embodiment illustrated in FIG. 3, for example, the first RFID device 306 or the mode controller 362 may be configured to monitor the response of the second RFID device 308.

The method proceeds from 412 to 414. At 414, the RFID tag 102 determines whether the response of the second RFID device 108 is satisfactory. For example, in some embodiments, the RFID tag 102 may determine whether the second RFID device 108 responded to the interrogation signal within a threshold time period. This may be done, for example, by monitoring a status signal from the second RFID device 108. In another example embodiment, the RFID tag 102 may determine whether the response matches an expected response to the interrogation signal.

When it is determined that the response of the second RFID device 108 is satisfactory, the method 400 proceeds from 414 to 416, where the method 400 terminates and returns the value of any desired variables, such as an indication that the response of the second RFID device was satisfactory. When it is determined that the response of the second RFID device 108 is not satisfactory, the method 400 proceeds from 414 to 418.

At 418, the RFID tag 102 generates an error signal. The error signal may take the form of one or more control or command signals, such as a control signal for causing the second RFID device 108 to switch from a respond mode of operation to a stand-by mode of operation, a control signal for causing the first RFID device 106 to switch from a stand-by mode of operation to a respond mode of operation and/or a control signal to disable the second RFID device 108. The method 400 proceeds from 418 to 420. At 420, the first RFID device 106 responds to the interrogation signal. The response may include an indication that the response of the second RFID device 108 was not satisfactory. The method 400 proceeds from 420 to 422, where the method 400 terminates and returns the value of any desired variables.

When it is determined at 406 that the first RFID device 106 is to operate in the third mode of operation, the first RFID device 106 selectively ignores the interrogation signal. This mode may be used, for example, to address the situation where the RFID tag 102 has determined that the first RFID device 106 is responding incorrectly to interrogation signals. In another example, an interrogator such as the interrogator 104 may instruct the RFID tag 102 or the first RFID device 106 to ignore interrogation signals. For example, the interrogator 104 may instruct the RFID tag 102 to ignore interrogation signals for a period of time and/or to not send a response signal to interrogation signals until another instruction is received. This mode of operation may be used, for example, to facilitate singulation of individual RFID tags when an interrogator is interrogating a plurality of RFID tags.

Figure 5:
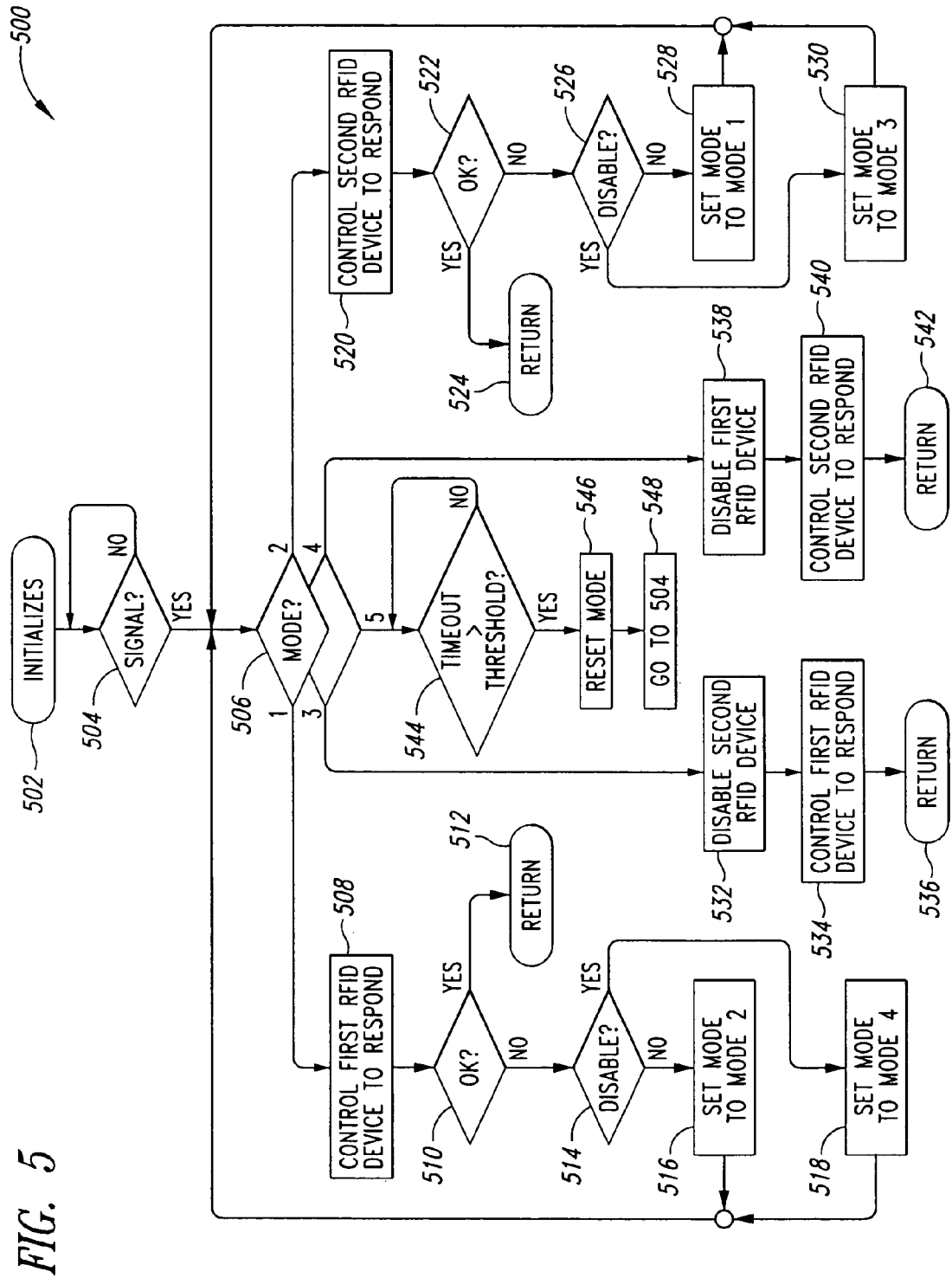
FIG. 5 is a high-level flow diagram showing a method of operating a radio-frequency identification system according to another illustrated embodiment.

FIG. 5 is a high-level flow diagram illustrating a method 500 of operating an RFID tag, such as the RFID tag 302 illustrated in FIG. 3, to provide redundancy in the event of a failure of one of the RFID devices 306, 308. Although the method 500 illustrated in FIG. 5 may be used to operate other embodiments, such as the embodiments illustrated in FIGS. 1 and 2, and may be modified to facilitate such use, for convenience the method 500 will generally be described with reference to FIG. 3.

The method 500 initializes at 502 and proceeds to 504. At 504, the RFID tag 302 determines whether an interrogation signal is being received. When the RFID tag 302 determines that an interrogation signal is being received, the method 500 proceeds from 504 to 506. When the RFID tag 302 determines that an interrogation signal is not being received, the method 500 returns to 504.

At 506, the RFID tag 302 determines whether to operate the RFID tag 302 in a first, a second, a third, a fourth mode or a fifth mode of operation. For example, in a first mode as illustrated the RFID tag 302 is configured to control the first RFID device 306 so as to respond to an interrogation signal and, in the event the first RFID device 306 fails to respond in a satisfactory manner, to select another mode of operation. In a second mode of operation, the RFID tag 302 is configured to control the second RFID device 308 so as to respond to an interrogation signal and, in the event the second RFID device 308 fails to respond in a satisfactory manner, to select another mode of operation. In a third mode of operation, the RFID tag 302 is configured to control the first RFID device 306 so as to respond to an interrogation signal and to disable the second RFID device 308. For example, in a fourth mode of operation, the RFID tag 302 may be configured to control the second RFID device 308 so as to respond to an interrogation signal and to disable the first RFID device 306. In a fifth mode of operation, the RFID tag 302 does not respond to an interrogation signal. For example, as discussed above, the RFID tag 302 may be instructed to not respond to interrogation signals for a threshold period of time.

The mode of operation may be determined, for example, by checking a value of a mode indicator stored in a memory, such as the memory 366. The initial mode of operation of the RFID tag 302 may be set, for example, during manufacture of the RFID tag 302, or it may be set or reset in response to received signals, such as a command signal from an interrogator (see interrogator 104 in FIG. 1), a command or control signal from one of the first or second RFID devices 306, 308, and/or a signal from the mode controller 362. Not all modes of operation need be employed and additional modes of operation may be employed. For example, in a sixth mode of operation the RFID tag 302 may be configured to store data in each of the RFID devices on the substrate 303.

When it is determined at 506 that the RFID tag 302 is to operate in the first mode of operation, the method 500 proceeds from 506 to 508. At 508, the RFID tag 302 generates control signals to cause the first RFID device 306 to respond to the interrogation signal. The method 500 proceeds from 508 to 510.

At 510, the RFID tag 302 determines whether the first RFID device 306 responded to the interrogation signal in a satisfactory manner. When it is determined at 510 that the first RFID device 306 responded in a satisfactory manner, the method proceeds from 510 to 512, where the method 500 terminates and returns the value of any desired variables.

When it is determined at 510 that the first RFID device 306 did not respond in a satisfactory manner, the method proceeds from 510 to 514. At 514, the RFID tag 302 determines whether the first RFID device 306 should be disabled. This may be determined, for example, by the nature of the response of the first RFID device 306 to the interrogation signal. For example, the RFID tag 302 may determine to disable the first RFID device 306 if the response contains incorrect data. In another example, the RFID tag 302 may determine to disable the first RFID device 306 if a failure rate threshold has been exceeded. The RFID tag 302 may store data for use in determining whether to disable the first RFID device 306 in a memory, such as the memory 324, the memory 342 and/or the memory 366.

When it is determined at 514 that the first RFID device 306 should not be disabled, the method 500 proceeds from 514 to 516. At 516, the RFID tag 302 generates control signals to set the mode of operation to the second mode, and the method 500 returns to 506. When it is determined that the first RFID device 306 should be disabled, the method 500 proceeds from 514 to 518. At 518, the RFID tag 302 generates control signals to set the mode of operation to the fourth mode, and the method 500 returns to 506.

When it is determined at 506 that the RFID tag 302 is to operate in the second mode of operation, the method 500 proceeds from 506 to 520. At 520, the RFID tag 302 generates control signals to cause the second RFID device 308 to respond to the interrogation signal. The method 500 proceeds from 520 to 522.

At 522, the RFID tag 302 determines whether the second RFID device 308 responded to the interrogation signal in a satisfactory manner. When it is determined at 522 that the second RFID device 308 responded in a satisfactory manner, the method 500 proceeds from 522 to 524, where the method 500 terminates and returns the value of any desired variables.

When it is determined at 522 that the second RFID device 308 did not respond in a satisfactory manner, the method 500 proceeds from 522 to 526. At 526, the RFID tag 302 determines whether the second RFID device 308 should be disabled. This may be determined, for example, by the nature of the response of the second RFID device 308 to the interrogation signal. For example, the RFID tag 302 may determine to disable the second RFID device 308 if the response contains incorrect data. In another example, the RFID tag 302 may determine to disable the second RFID device 308 if a failure rate threshold has been exceeded. The RFID tag 302 may store data for use in determining whether to disable the second RFID device 308 in a memory, such as the memory 324, the memory 342 and/or the memory 366.

When it is determined at 526 that the second RFID device 308 should not be disabled, the method 500 proceeds from 526 to 528. At 528, the RFID tag 302 generates control signals to set the mode of operation to the first mode, and the method 500 returns to 506. When it is determined that the second RFID device 308 should be disabled, the method 500 proceeds from 526 to 530. At 530, the RFID tag 302 generates control signals to set the mode of operation to the third mode, and the method 500 returns to 506.

When it is determined at 506 that the RFID tag 302 is to operate in the third mode of operation, the method 500 proceeds from 506 to 532. At 532, the RFID tag 302 generates control signals to disable the second RFID device 308. The method 500 proceeds from 532 to 534. At 534, the RFID tag 302 generates control signals to cause the first RFID device 306 to respond to the interrogation signal. The method 500 proceeds from 534 to 536, where the method 500 terminates and returns the value of any desired variables.

When it is determined at 506 that the RFID tag 302 is to operate in the fourth mode of operation, the method 500 proceeds from 506 to 538. At 538, the RFID tag 302 generates control signals to disable the first RFID device 306. The method 500 proceeds from 538 to 540. At 540, the RFID tag 302 generates control signals to cause the second RFID device 308 to respond to the interrogation signal. The method 500 proceeds from 540 to 542, where the method 500 terminates and returns the value of any desired variables.

When it is determined at 506 that the RFID tag 302 is to operate in the fifth mode of operation, the method 500 proceeds from 506 to 544. At 544 the RFID tag determines whether a time-out threshold has been exceeded. This may be done, for example, by using a clock or a counter. When it is determined that the time-out threshold has not been exceeded, the method 500 returns to 544. When it is determined that the time-out threshold has been exceeded, the method 500 proceeds from 544 to 546. At 546, the RFID tag 302 resets the mode of operation of the RFID tag 302. This may be done, for example, by resetting the mode of operation to a default mode of operation, or by returning to a prior mode of operation.

Figure 6:
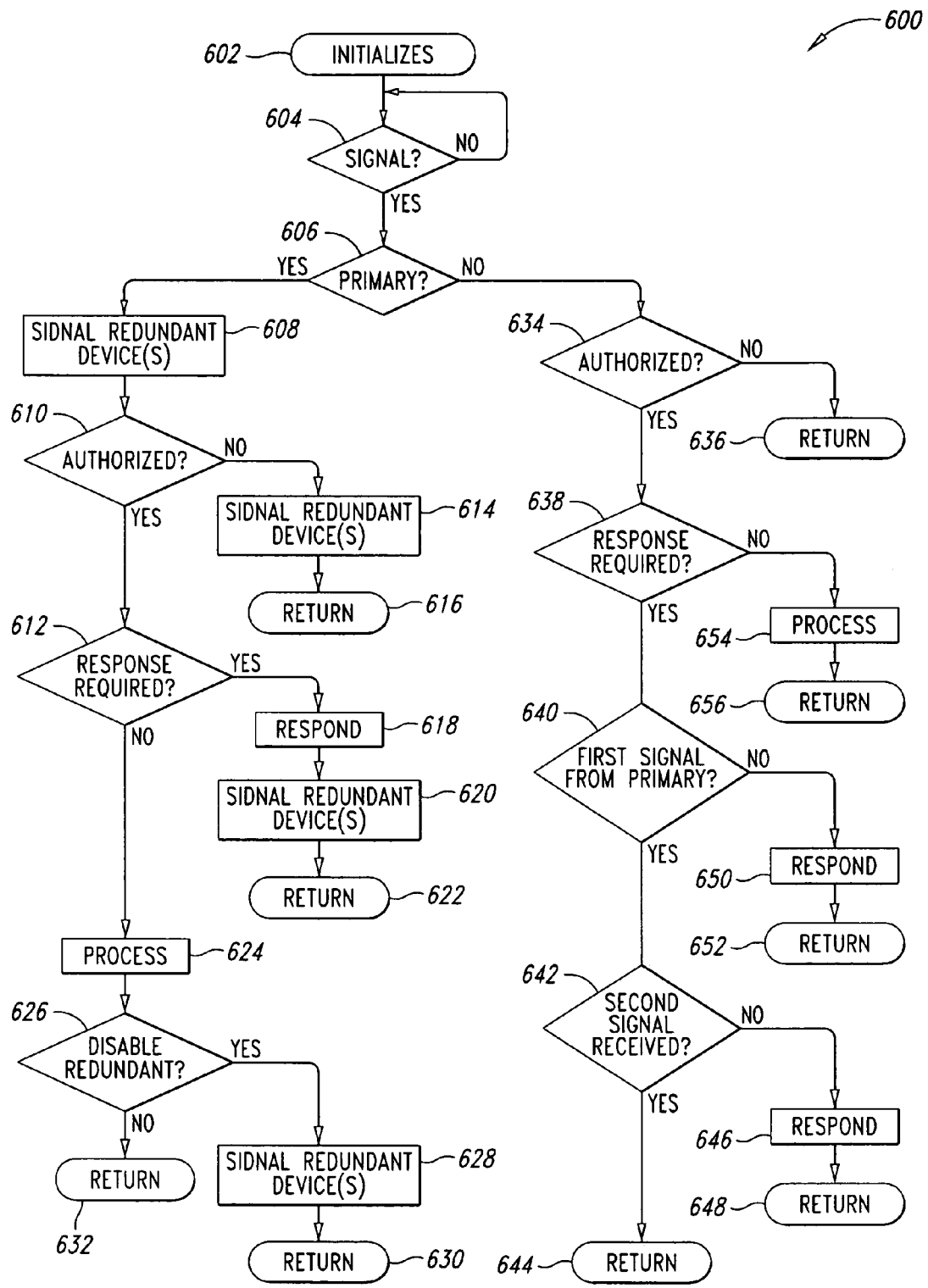
FIG. 6 is a high-level flow diagram showing a method of operating a radio-frequency identification system according to yet another illustrated embodiment.

FIG. 6 is a high-level flow diagram illustrating a method 600 of operating an RFID device, such as the RFID device 206 illustrated in FIG. 2, to provide redundancy in the event of a failure of one of the RFID devices 206, 208. Although the method 600 illustrated in FIG. 6 also may be used to operate other embodiments, such as the embodiments illustrated in FIGS. 1 and 3, and may be modified to facilitate such use, for convenience the method 600 will generally be described with reference to FIG. 2.

The method 600 initializes at 602 and proceeds to 604. At 604, the RFID device 206 determines whether a signal from an interrogation is being received. When the RFID device 206 determines that an interrogation signal is being received, the method 600 proceeds from 604 to 606. When the RFID device 206 determines that an interrogation signal is not being received, the method 600 returns to 604.

At 606, the first RFID device 206 determines whether to operate in a first, or a second mode of operation. For example, as illustrated the first RFID device 206 is configured to process a signal from an interrogator in a first mode of operation and to stand-by in a second mode of operation. The mode of operation may be determined, for example, by checking a value of a mode indicator stored in a memory, such as the memory 224 of FIG. 2. In another example, the mode of operation may be determined based on a signal, such as a command or control signal, received from another RFID device on the substrate 203, such as the second RFID device 208, or a signal from another device on the substrate, such as a mode controller (see mode controller 362 in FIG. 3), or the absence of such a signal. A mode of operation of the first RFID device 206 may be set, for example, during manufacture of the RFID tag 202, or it may be set or reset in response to received signals, such as a command or control signal from the interrogator 104 or a signal from the second RFID device 208, or, with reference to FIG. 3, a signal from the mode controller 362. As illustrated in FIG. 6, the mode of operation corresponds to whether the RFID device 206 is the primary RFID device or a redundant RFID device.

When it is determined at 606 that the first RFID device 206 is to operate in the first mode of operation (e.g., it is set as the primary RFID device on the substrate), the method 600 proceeds from 606 to 608. At 608, the first RFID device 206 sends a ready signal to one or more redundant RFID devices on the substrate 203 to indicate that the first RFID device 206 is preparing to process the interrogation signal. The ready signal may be a single pulse, for example, to signal the redundant RFID devices that the first RFID device 206 is aware of the received signal.

The method 600 proceeds from 608 to 610. At 610, the first RFID device 206 determines whether the interrogation signal is from an authorized source, such as an authorized interrogator. When it is determined at 610 that the interrogation signal is from an authorized source, the method 600 proceeds from 610 to 612. When it is determined at 610 that the interrogation signal is not from an authorized source, the method 600 proceeds from 610 to 614, where the first RFID device 206 optionally sends another signal to one or more redundant RFID devices on the substrate 203 to indicate that the interrogation signal is not from an authorized source. The method 600 proceeds from 614 to 616, where the method 600 terminates and returns the value of any desired variables.

At 612, the first RFID device 206 determines whether a response to the authorized interrogation signal is required. When it is determined that a response to the authorized interrogation signal is required, the method 600 proceeds from 612 to 618. At 618, the first RFID device 206 transmits a response to the authorized interrogation signal. The first RFID device 206 also may perform other acts at 618. For example, the first RFID device 206 may process a write command at 618. The method 600 proceeds from 618 to 620. At 620, the first RFID device 206 optionally sends another signal to one or more redundant RFID devices on the substrate 203 to indicate that the first RFID device 206 has successfully responded to the authorized interrogation signal. The method 600 proceeds from 620 to 622, where the method 600 terminates and returns the value of any desired variables.

When it is determined at 612 that a response to the authorized interrogation signal is not required, the method 600 proceeds from 612 to 624. At 624, the first RFID device 206 processes the authorized interrogation signal, which may comprise, for example, a write command. The method 600 proceeds from 624 to 626. At 626, the first RFID device 206 determines whether to temporarily disable the redundant RFID device(s) on the RFID substrate 203. For example, the first RFID device 206 may determine to temporarily disable the redundant RFID device(s) when the authorized interrogation signal comprises a command to temporarily ignore queries from interrogators. In another example, the first RFID device 206 may determine not to disable the redundant RFID device(s) when a write command is received.

When it is determined at 626 to temporarily disable the redundant RFID device(s), the method 600 proceeds from 626 to 628. At 628, the first RFID device 206 sends a signal to the redundant RFID device(s) on the substrate 203 to temporarily disable the redundant RFID device(s) on the substrate. The method 600 proceeds from 628 to 630, where the method 600 terminates and returns the value of any desired variables. When it is determined at 626 not to temporarily disable the redundant RFID devices, the method 600 proceeds from 626 to 632, where the method 600 terminates and returns the value of any desired variables.

When it is determined at 606 that the first RFID device 206 is to operate in a second mode of operation (i.e., as a secondary or redundant RFID device on the substrate), the method 600 proceeds from 606 to 634. At 634, the first RFID device 206 determines whether the received interrogation signal is from an authorized source, such as an authorized interrogator. The first RFID device 206 may, for example, be configured to determine whether the signal is from an authorized source based on the interrogation signal, data stored in a memory, a signal received from another RFID device on the substrate, and/or various combinations of the above. When it is determined that the interrogation signal is not from an authorized source, the method 600 proceeds from 634 to 636, where the method 600 terminates and returns the value of any desired variables. For example, the first RFID device 206 may store data related to unauthorized interrogation signals. When it is determined that the interrogation signal is from an authorized source, the method 600 proceeds from 634 to 638.

At 638, the first RFID device 206 determines whether a response to the authorized interrogation signal is required. When it is determined that a response to the authorized interrogation signal is required, the method 600 proceeds from 638 to 640. At 640, the first RFID device 206 determines whether another RFID device on the substrate is preparing to respond to the authorized interrogation signal. For example, the first RFID device 206 may determine whether it has received a signal from another RFID device on the substrate (such as the second RFID device 208) indicating the other RFID device is aware of the authorized interrogation signal. The first RFID device 206 may be configured to wait for a threshold period of time before determining whether it has received a signal indicating another RFID device on the substrate is aware of the authorized interrogation signal. When it is determined at 640 that another RFID device on the substrate is preparing to respond to the authorized interrogation signal, the method 600 proceeds from 640 to 642.

At 642, the first RFID device 206 determines whether another RFID device on the substrate 203 responded to the authorized interrogation signal. This may be done, for example, by determining whether a second signal was received from an RFID device on the substrate 203 that previously sent a signal indicating it was aware of the authorized interrogation signal. In another example, this may be done by determining whether a signal indicating another RFID device on the substrate 203 is preparing to respond remained active for a threshold period of time. When it is determined at 642 that another device on the substrate 203 responded to the authorized interrogation signal, the method 600 proceeds from 642 to 644, where the method 600 terminates and returns the value of any desired variable. When it is determined at 642 that another device on the substrate 203 did not respond to the authorized interrogation signal, the method proceeds from 642 to 646. At 646, the first RFID device 206 responds to the authorized interrogation signal. The first RFID device 206 may also perform other acts at 646, such as executing a write command. The method 600 proceeds from 646 to 648, where the method 600 terminates and returns the value of any desired variables.

When it is determined at 640 that another RFID device on the substrate is not preparing to respond to the authorized interrogation signal, the method 600 proceeds from 640 to 650. At 650, the first RFID device 206 responds to the authorized interrogation signal. The first RFID device 206 may also perform other acts at 650, such as executing a write command. The method 600 proceeds from 650 to 652, where the method 600 terminates and returns the value of any desired variables.

When it is determined at 638 that no response to the authorized interrogation signal is required, the method 600 proceeds from 638 to 654. At 654 the first RFID device 206 processes the authorized interrogation signal. For example, the first RFID device 206 may execute a write command in response to the authorized interrogation signal. The method 600 proceeds from 654 to 656, where the method 600 terminates and returns the value of any desired variables.

Embodiments of the methods discussed in FIGS. 4, 5 and 6 may contain additional acts not shown in FIGS. 4, 5 and 6, may not contain all of the acts shown in FIGS. 4, 5 and 6, may perform acts shown in FIGS. 4, 5 and 6 in various orders, and may combine acts shown in FIGS. 4, 5 and 6. For example, the embodiment illustrated in FIG. 4 may be modified to temporarily or permanently disable the second radio-frequency identification device at 418. In another example, the embodiment illustrated in FIG. 5 may be modified to selectively determine in the third mode of operation to set the mode to the first mode of operation. In another example, the embodiment of FIG. 6 may be modified to employ a single signal from a primary RFID device to secondary or redundant RFID devices.

Figure 7:
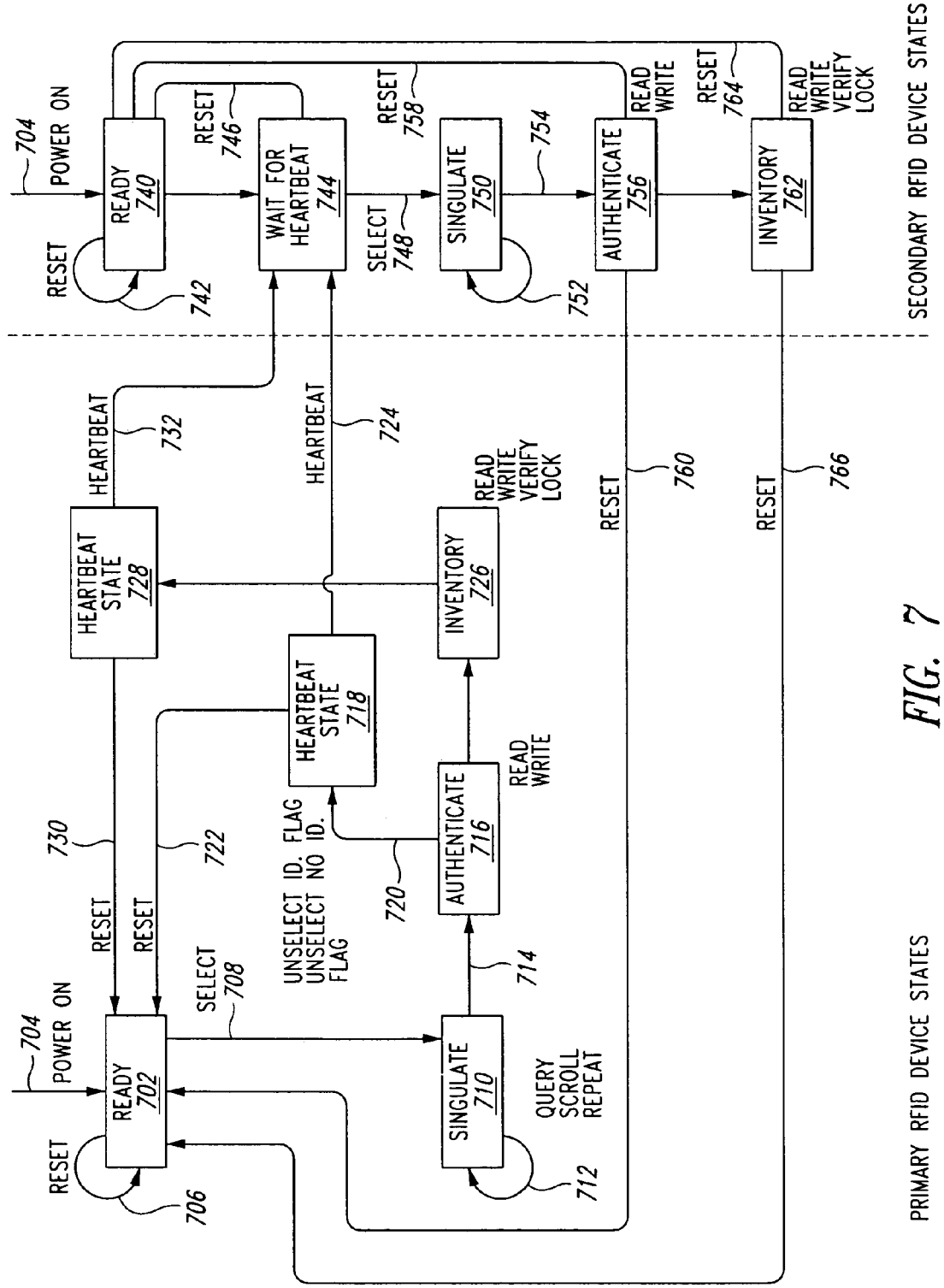
FIG. 7 is a state diagram showing example operating states of a radio-frequency identification tag according to one illustrated embodiment.

FIG. 7 is a state diagram 700 illustrating example operating states of an embodiment of a radio-frequency identification tag, such as the embodiment of an RFID tag 102 illustrated in FIG. 1. For convenience, the state diagram 700 will be described with respect to the embodiment illustrated in FIG. 1, although it may be employed in other embodiments, such as the embodiments illustrated in FIGS. 2 and 3.

At a ready state 702, a primary RFID device, such as RFID device 106 of FIG. 1, is prepared to process an interrogation signal. The primary RFID device 106 may enter the ready state 702 in response to power ON signal or command 704. For example, the primary RFID device 106 may power ON 704 in response to power being extracted from an interrogation signal or in response to receipt of an interrogation signal. The primary RFID device 106 also may enter the ready state 702 in response to a reset command, such as the reset command 706, as discussed in more detail below. The reset command 706 may, or may not, cause the first RFID device 106 to time-out or ignore received interrogation signals for a fixed period of time.

In response to a received interrogation signal, the primary RFID device 106 may issue a select command 708 and transition to a singulate state 710 where the primary RFID device 106 determines whether the interrogation signal contains an indication that the interrogation signal is being specifically directed to the RFID tag 102. In some embodiments, the primary RFID device 106 may determine whether the interrogation signal is being specifically directed to the primary RFID device 106 or to one or more secondary RFID devices associated with the primary RFID device, such as one or more redundant RFID devices sharing a substrate with the primary RFID device (i.e., RFID device 108 illustrated in FIG. 1). This may be done, for example, by employing one or more identification codes contained in the interrogation signal. In one example embodiment, each RFID device may be assigned a unique identification code. The primary RFID device 106 may store its own identification code and the identification codes of redundant RFID devices associated with the primary RFID device (such as an identification code associated with RFID device 108 in FIG. 1). The primary RFID device 106 may compare one or more codes in an interrogation signal to the stored codes. In another example embodiment, the primary RFID device 106 and one or more secondary or redundant RFID devices associated with the primary RFID device 106 (such as the RFID device 108 of FIG. 1) may share one or more identification codes. The first RFID device 106 also may execute various commands in the singulate state 710, such as a query, scroll and/or repeat command, which is illustrated in FIG. 7 as the loop 712.

The first RFID device 106 proceeds 714 from the singulate state 710 to the authenticate state 716. In some embodiments, the authenticate state 716 may be combined with the singulate state 710. In some embodiments, the first RFID device 106 may enter the authenticate state 716 before entering the singulate state 710. In some embodiments, the singulate state 710 and/or the authenticate state 716 may be omitted. At the authenticate state 716, the first RFID device 106 determines whether the interrogation signal is from an authorized source. Information generated during the singulate state 710 and/or the authenticate state 716 is used by the first RFID device 106 to determine whether to proceed to a first heartbeat state 718. This is illustrated in FIG. 7 as the setting 720 of an UnselectID_Flag or an UnselectNoID_Flag.

The UnselectID_Flag may be set, and the first heartbeat state 718 entered, for example, when an interrogation signal is received from an authorized source, but the interrogation signal does not require a response to be transmitted by the RFID tag 102. For example, a code in the signal might not match a code associated with the RFID tag 102, or the interrogation signal may contain an instruction for the RFID tag 102 to ignore the signal. The UnselectNoID_Flag may be set, and the first heartbeat state 718 entered, for example, when an interrogation signal is received from an unauthorized source. At the first heartbeat state 718, a reset command 722 is generated, returning the first RFID device 106 to the ready state 702. The reset command 722 may, or may not, cause the first RFID device 106 to time-out or ignore received interrogation signals for a fixed period of time. A heartbeat signal 724 may also be generated and sent to one or more secondary or redundant RFID devices, such as the RFID device 108 illustrated in FIG. 1, as discussed in more detail below.

When the first RFID device 106 determines not to enter the first heartbeat state 718, the first RFID device 106 proceeds from the authenticate state 716 to the inventory state 726. At the inventory state 726, the first RFID device 106 may execute various commands in response to the interrogation signal, such as read, write, verify and lock commands, which may include transmitting one or more signals in response to the interrogation signal. The first RFID device 106 proceeds from the inventory state 726 to the second heartbeat state 728.

At the second heartbeat state 728 the first RFID device 106 generates a reset command 730 to cause the first RFID device 106 to return to the ready state 702. The reset command 730 may, or may not, cause the first RFID device 106 to time-out or ignore received interrogation signals for a fixed period of time. A heart beat signal 732 also is generated and sent to one or more secondary or redundant RFID devices, such as the RFID device 108 illustrated in FIG. 1, as discussed in more detail below.

At a ready state 740, a secondary or redundant RFID device, such as RFID device 108 of FIG. 1, is prepared to process an interrogation signal. The second RFID device 108 may enter the ready state 740 in response to the power ON signal or command 704. For example, the second RFID device 108 may power ON 704 in response to power being extracted from an interrogation signal or in response to receipt of an interrogation signal. The second RFID device 108 also may enter the ready state 740 in response to a reset command, such as the reset command 742, as discussed in more detail below. The reset command 742 may, or may not, cause the second RFID device 108 to time-out or ignore received interrogation signals for a fixed period of time.

In response to a received interrogation signal, the second RFID device 108 proceeds to a wait for heartbeat state 744. If a heartbeat signal is received within a predetermined period of time (which may vary, for example, based on the nature of the interrogation signal) the second RFID device 108 may issue a reset command 746 to cause the second RFID device 108 to return to the ready state 740. The reset command 746 may, or may not, cause the second RFID device 108 to time-out or ignore received interrogation signals for a fixed period of time. If no heartbeat signal is received within the predetermined period of time, the second RFID device 108 may issue a select command 748 and transition to a singulate state 750.

At the singulate state 750 the second RFID device 108 determines whether the interrogation signal contains an indication that the interrogation signal is being specifically directed to the RFID tag 102. In some embodiments, the second RFID device 108 may determine whether the interrogation signal is being specifically directed to the primary RFID device 106, to the second RFID device 108, or to additional secondary RFID devices associated with the RFID tag 102. This may be done, for example, using methods similar to those discussed above with respect to the first RFID device 106. The second RFID device 108 also may execute various commands in the singulate state 750, such as a query, scroll and/or repeat command, which is illustrated in FIG. 7 as the loop 752.

The second RFID device 108 proceeds 754 from the singulate state 750 to the authenticate state 756. In some embodiments, the authenticate state 756 may be combined with the singulate state 750. In some embodiments, the second RFID device 108 may enter the authenticate state 756 before entering the singulate state 750. In some embodiments, the singulate state 750 and/or the authenticate state 756 may be omitted. At the authenticate state 756, the second RFID device 108 determines whether the interrogation signal is from an authorized source. Information generated during the singulate state 750 and/or the authenticate state 756 is used by the second RFID device 108 to determine whether to issue one or more reset commands 758, 760 to cause the second RFID device 108 and/or the first RFID device 106 to return to their respective ready states 740, 702. The reset command 758 may, or may not, cause the second RFID device 108 to time-out or ignore received interrogation signals for a fixed period of time. The reset command 760 may, or may not, cause the first RFID device 106 to time-out or ignore received interrogation signals for a fixed period of time.

When the second RFID device 108 determines not to issue one or more reset commands 758, 760, the second RFID device 108 proceeds from the authenticate state 756 to the inventory state 762. At the inventory state 762, the second RFID device 108 may execute various commands in response to the interrogation signal, such as read, write, verify and lock commands, which may include transmitting one or more signals in response to the interrogation signal. The second RFID device 108 then issues a reset command 764 and returns to the ready state 740. The reset command 764 may, or may not, cause the second RFID device 108 to time-out or ignore received interrogation signals for a fixed period of time. The second RFID device 108 may also issue a reset command 766 to cause the first RFID device 106 to return to the ready state 702. The reset command 766 may, or may not, cause the first RFID device 106 to time-out or ignore received interrogation signals for a fixed period of time.

Figure 8:
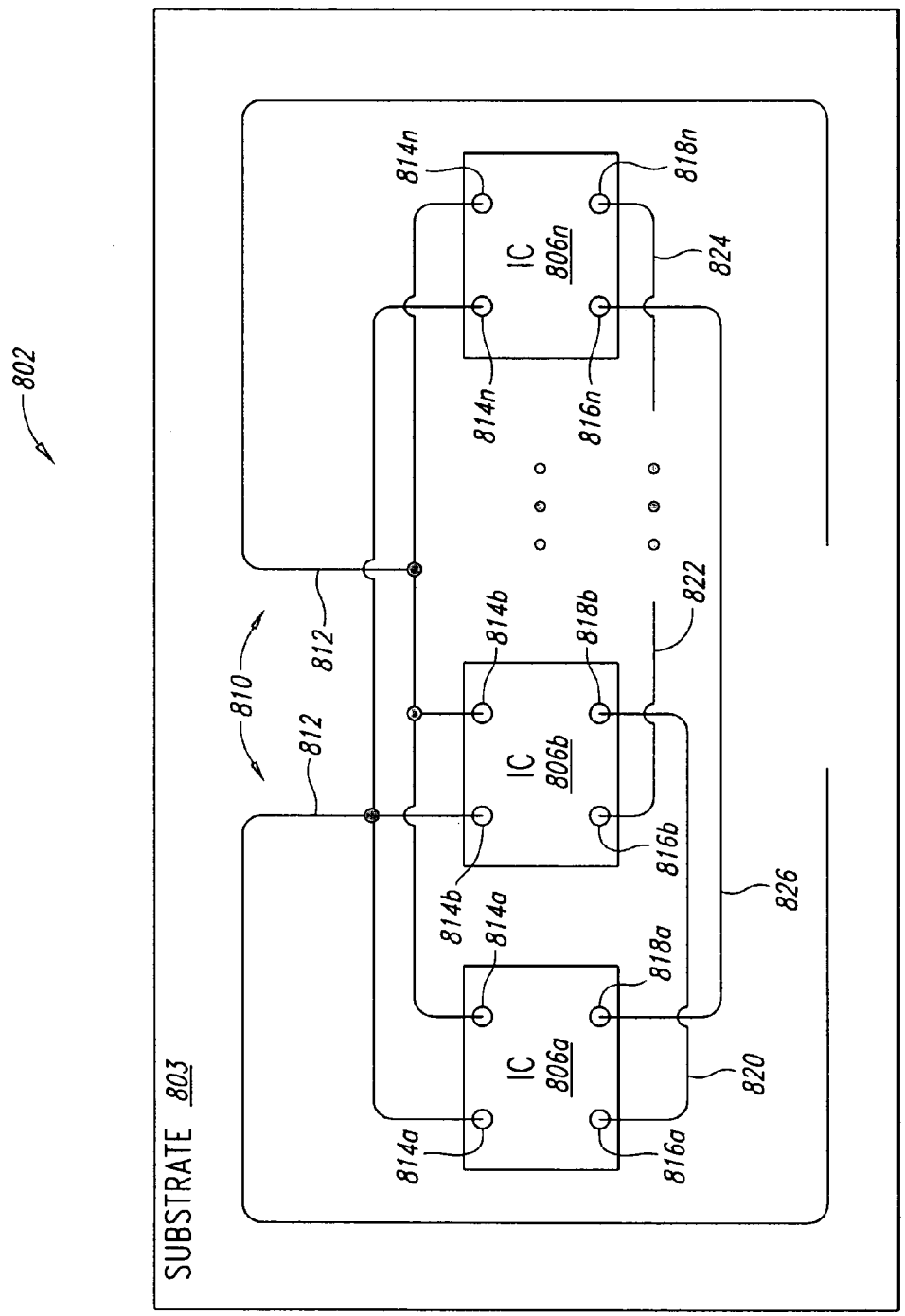
FIG. 8 is schematic diagram showing a radio-frequency identification tag according to one illustrated embodiment.

FIG. 8 is schematic diagram illustrating an embodiment of a radio-frequency identification tag 802. The tag 802 comprises a substrate 803. A plurality of RFID integrated circuits, or RFID chips 806a, 806b, . . . 806n are coupled to the substrate 803. The RFID chips 806a, 806b, . . . 806n may be coupled to the substrate 803 by using, for example, flip-chip techniques. An antenna system 810 on the substrate 803 comprises an antenna 812. The antenna 812 is electrically coupled to the plurality of RFID chips 806a, 806b, . . . 806n, through interfaces or pins 814a, 814b, . . . 814n on the respective RFID chips. Successive chips 806a, 806b, . . . 806n are communicatively coupled on the substrate. As illustrated, each RFID chip has a respective interface of pin 816a, 816b, . . . 816n for transmitting signals, such as the heartbeat signal discussed above with respect to FIG. 7, to other RFID chips on the substrate 803. Each chip 806a, 806b, . . . 806n also has a respective interface or pin 818a, 818b, . . . 818n, for receiving signals from other RFID chips on the substrate 803. As illustrated, a trace 820 on the substrate 803 electrically connects the transmitting pin 816a of chip 806a to the receiving pin 818b of RFID chip 806b, a trace 822 on the substrate 803 electrically connects the transmitting pin 816b of RFID chip 806b to the next RFID chip in the plurality of RFID chips (not shown), a trace 824 on the substrate 803 electrically connects the receiving pin 818n of the RFID chip 806n to the previous RFID chip in the plurality of RFID chips (not shown), and a trace 826 on the substrate 803 electrically connects the transmitting pin 816n of the RFID chip 806n to the receiving pin 818a of RFID chip 806a.

Figure 9:
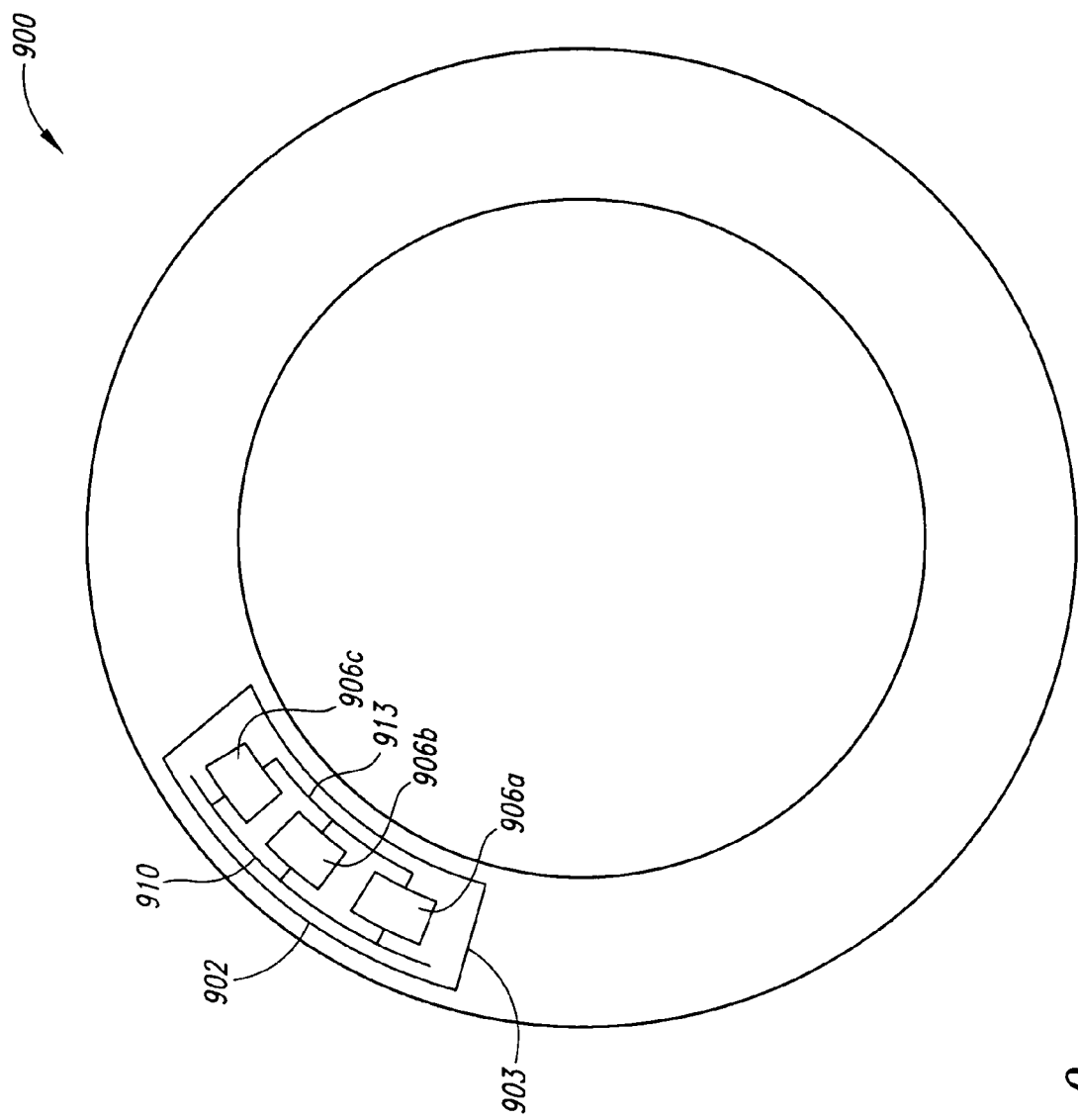
FIG. 9 is schematic diagram showing an asset with an embedded radio-frequency identification tag according to one illustrated embodiment.

FIG. 9 is schematic diagram illustrating an embodiment of an asset 900 with an embedded radio-frequency identification tag 902. As illustrated, the asset 900 is a tire. The asset 900 has an embedded RFID tag 902. The RFID tag 902 has a substrate 903. Three RFID chips 906a, 906b and 906c are coupled to the substrate 903. The RFID chips 906a, 906b, 906c are electrically coupled to an antenna system 910 and to each other through a bus system 913.

The term "computer-readable medium" as used herein refers to any medium that participates in providing instructions to a system or a processor for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM and an EEPROM, a FLASH-EPROM, any other memory chip or cartridge, a carrier wave, or any other medium from which a computer can read. Various forms of computer readable media may be involved in carrying one or more sequences of one or more instructions to a processor for execution.

Although specific embodiments of and examples for the RFID tags, devices, methods, and articles are described herein for illustrative purposes, various equivalent modifications can be made without departing from the spirit and scope of this disclosure, as will be recognized by those skilled in the relevant art. The various embodiments described above can be combined to provide further embodiments.

These and other changes can be made to the invention in light of the above-detailed description. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. A radio-frequency identification tag comprising:
a substrate;
a first radio-frequency identification device carried by the substrate and having a first data system, the first radio-frequency identification device being coupled to a first antenna and configured to respond to an interrogation signal; and
a second radio-frequency identification device carried by the substrate and having a second data system separate from the first data system, the second radio-frequency identification device being coupled to a second antenna and configured to:
monitor transmission of a response of the first radio-frequency identification device to the interrogation signal; and
selectively respond to the interrogation signal based on the monitoring.

2. The radio-frequency identification tag of claim 1, further comprising:
a controller configured to selectively generate control signals to cause the second radio-frequency identification device to respond to the interrogation signal when the monitoring indicates the first radio-frequency identification device failed to respond to the interrogation signal.

3. The radio-frequency identification tag of claim 1 wherein the first radio-frequency identification device comprises a first integrated circuit carried by the substrate.

4. The radio-frequency identification tag of claim 3 wherein the second radio-frequency identification device comprises a second integrated circuit carried by the substrate.

5. The radio-frequency identification tag of claim 4 wherein the second integrated circuit is identical to the first integrated circuit.

6. The radio-frequency identification tag of claim 1 wherein the monitoring comprises determining whether the first radio-frequency identification device correctly responded to the interrogation signal.

7. An asset comprising:
an antenna system;
a first radio-frequency identification device, having a first data system, electrically coupled to the antenna system and configured to respond to an interrogation signal; and
a second radio-frequency identification device, having a second data system separate from the first data system, electrically coupled to the antenna system and to the first radio-frequency identification device and configured to:
monitor an indication of a response of the first radio-frequency identification device to the interrogation signal; and
selectively respond to the interrogation signal based on the monitoring of the indication.

8. The asset of claim 7 wherein the first radio-frequency identification device is configured to generate the monitored indication.

9. The asset of claim 7 wherein the first radio-frequency identification device comprises a first integrated circuit.

10. The asset of claim 9 wherein the second radio-frequency identification device comprises a second integrated circuit identical to the first integrated circuit.

11. The asset of claim 7, further comprising:
a third radio-frequency identification device electrically coupled to the antenna system and to the second radio-frequency identification device and configured to:
monitor an indication of a response of the second radio-frequency identification device to the interrogation signal; and
selectively respond to the interrogation signal based on the monitoring of the indication of the response of the second radio-frequency identification device.

12. A radio-frequency identification substrate comprising:
an antenna system coupled to the substrate;
a first radio-frequency identification device having a first data system; and
a second radio-frequency identification device having a second data system separate from the first data system, the second radio-frequency identification device being coupled to the first radio-frequency identification device and configured to:
in a first mode of operation, monitor a response of the first radio-frequency identification device to an interrogation signal and selectively respond to the interrogation signal based on the monitoring of the response; and in a second mode of operation, respond to the interrogation signal.

13. The radio frequency identification substrate of claim 12 wherein the second radio-frequency identification device is further configured to selectively disable the first radio-frequency identification device.

14. The radio-frequency identification substrate of claim 13 wherein the disabling of the first radio-frequency identification device is temporary.

15. The radio-frequency identification substrate of claim 12 wherein the second radio-frequency identification device is disabled in a third mode of operation.

16. The radio-frequency identification substrate of claim 12, further comprising a mode controller coupled to the first radio-frequency identification device and configured to generate control signals to control the mode of operation of the second radio-frequency identification device.

17. A radio-frequency identification system comprising:
an interrogator configured to generate a signal; and
an asset comprising:
means for receiving the signal;
first means for selectively responding to the signal having a first data system, and electrically coupled to the means for receiving the signal;
redundant means for selectively responding to the signal having a second data system, and electrically coupled to the means for receiving the signal; and
means for determining whether the first means for selectively responding to the signal responded to the signal electrically coupled to the first means for selectively responding to the signal and to the redundant means for selectively responding to the signal.

18. The radio-frequency identification system of claim 17, further comprising:
a first integrated circuit comprising the first means for selectively responding to the signal; and
a second integrated circuit comprising the redundant means for selectively responding to the signal.

19. The radio-frequency identification system of claim 18, wherein the second integrated circuit further comprises the means for determining whether the first means for selectively responding to the signal responded to the signal.

20. The radio-frequency identification system of claim 17, further comprising:
a substrate coupled to the asset wherein the means for receiving the signal, the first means for selectively responding to the signal, the redundant means for selectively responding to the signal, and the means for determining whether the first means for selectively responding to the signal responded to the signal are carried by the substrate.

21. The radio-frequency identification system of claim 17 further comprising:
second redundant means for selectively responding to the signal coupled to the means for receiving the signal and comprising:
means for processing an indication of a response to the signal by the asset.

22. The radio-frequency identification system of claim 21 wherein the means for processing the indication of the response to the signal by the asset is configured to monitor an indication of a response by the first means for selectively responding to the signal.

23. A method of responding to an interrogation signal, the method being performed by a first radio-frequency identification device having a first data system, the method comprising:
receiving the interrogation signal; and
when the first radio-frequency identification device is configured to operate in a redundant mode of operation,
monitoring an indication of a second radio-frequency identification device responding to the interrogation signal, the second radio-frequency identification device having a second data system separate from the first data system; and
selectively generating a response to the interrogation signal based on the indication.

24. The method of claim 23 wherein monitoring the indication of the second radio-frequency identification device responding to the interrogation signal comprises determining whether the second radio-frequency device correctly responded to the interrogation signal.

25. The method of claim 23, further comprising:
when the first radio-frequency identification device is configured to operate in a time-out mode of operation, disregarding the interrogation signal.

26. The method of claim 23, further comprising:
when the first radio-frequency identification device is configured to operate in a primary mode of operation, generating the response to the interrogation signal.

27. A non-transitory computer-readable medium containing contents that cause a first radio-frequency identification device to process an interrogation signal by performing a method comprising:
receiving the interrogation signal;
when the first radio-frequency identification device is configured to operate in a first mode of operation,
generating a response to the interrogation signal using a data system of the first radio-frequency identification device; and
generating an indication of the response to the interrogation signal by the first radio-frequency identification device;
when the first radio-frequency identification device is configured to operate in a second mode of operation,
monitoring an indication of a second radio-frequency identification device responding to the interrogation signal, the second radio-frequency identification device being configured to generate a response using a data system of the second radio-frequency identification device; and
selectively generating the response to the interrogation signal based on the indication; and
when the first radio-frequency identification device is configured to operate in a third mode of operation,
disregarding the interrogation signal.

28. The non-transitory computer-readable medium of claim 27 wherein the contents are instructions stored in a memory.

* * * * *

UNITED STATES PATENT AND TRADEMARK OFFICE
CERTIFICATE OF CORRECTION

PATENT NO. : 8,120,461 B2 Page 1 of 1
APPLICATION NO. : 11/397923
DATED : February 21, 2012
INVENTOR(S) : Timothy L. Zimmerman et al.

It is certified that error appears in the above-identified patent and that said Letters Patent is hereby corrected as shown below:

Item 56:
""RFID Tags by RFIDSupplyChain.com," URL: http://www.rfidsupplychain.com/Categories.bok?category=RFID+Tags, 2006, download date Jun. 22, 2006, pp. 1-3." should read, --"RFID Tags by RFIDSupplyChain.com," URL: http://www.rfidsupplychain.com/Categories.bok?category=RFID+Tags, 2006, download date Jun. 22, 2006, pp. 1-3.--.

Item 56:
"AIM USA, "Uniform Symbology Specification 13 Codabar," American National Standards Institute, Inc., Approved Aug. 16, 1995, 11 pages." should read, --AIM USA, "Uniform Symbology Specification – Codabar," American National Standards Institute, Inc., Approved Aug. 16, 1995, 11 pages.--.

Signed and Sealed this
Nineteenth Day of June, 2012

David J. Kappos
*Director of the United States Patent and Trademark Office*